US007554683B2

(12) United States Patent
Kobayashi et al.

(10) Patent No.: US 7,554,683 B2
(45) Date of Patent: Jun. 30, 2009

(54) IMAGE PROCESSOR

(75) Inventors: Minako Kobayashi, Ikeda (JP); Hironobu Nakata, Itami (JP); Masakazu Murakami, Itami (JP); Kazumi Sawayanagi, Itami (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 910 days.

(21) Appl. No.: 11/025,964

(22) Filed: Jan. 3, 2005

(65) Prior Publication Data

US 2006/0082805 A1 Apr. 20, 2006

(30) Foreign Application Priority Data

Oct. 19, 2004 (JP) ............................ 2004-304474

(51) Int. Cl.
*G06K 15/00* (2006.01)

(52) U.S. Cl. .................................... 358/1.14; 358/1.18

(58) Field of Classification Search ................ 358/1.14, 358/1.18, 444, 404, 448, 443, 434, 2.1, 426.12
See application file for complete search history.

(56) References Cited

U.S. PATENT DOCUMENTS

| | | | | |
|---|---|---|---|---|
| 5,414,494 | A | 5/1995 | Aikens et al. | |
| 6,070,000 | A * | 5/2000 | Mori | 358/1.15 |
| 6,191,869 | B1 | 2/2001 | Miura | |
| 6,249,356 | B1 | 6/2001 | Yoshikawa et al. | |
| 6,307,643 | B1 | 10/2001 | Okada et al. | |
| 6,591,324 | B1 * | 7/2003 | Chen et al. | 710/302 |
| 2002/0089693 | A1 | 7/2002 | Maruyama | |
| 2003/0112472 | A1 | 6/2003 | Eguchi et al. | |
| 2004/0239992 | A1 | 12/2004 | Kawai et al. | |
| 2005/0060432 | A1 * | 3/2005 | Husain et al. | 709/246 |
| 2005/0141014 | A1 * | 6/2005 | Kikuchi et al. | 358/1.14 |

FOREIGN PATENT DOCUMENTS

JP 9-198211 A 7/1997

(Continued)

OTHER PUBLICATIONS

Official Action issued by the JPO in corresponding JP Appln. No. 2004-304474, Jun. 13, 2006, Japan; and English translation thereof.

*Primary Examiner*—Jerome Grant, II
(74) *Attorney, Agent, or Firm*—Buchanan Ingersoll & Rooney PC

(57) ABSTRACT

An image processor for executing an image-related process includes a portion for storing first usage situation information that indicates a usage situation of the image processor, a portion for obtaining second usage situation information that indicates a usage situation of a second image processor for executing the image-related process, a portion for determining a second image processor that can execute the image-related process more suitably than the image processor in accordance with the first usage situation information and the second usage situation information when an execution instruction of the image-related process is given by a user, a portion for controlling so that the execution of the image-related process is suspended in the image processor if it is determined that there is a second image processor that can execute the image-related process of the execution instruction more suitably than the image processor and that the image-related process is executed in the image processor if it is not determined that there is a second image processor that can execute the image-related process of the execution instruction more suitably than the image processor, a portion for delivering a message to the user who issued the execution instruction if it is determined that there is a second image processor that can execute the image-related process of the execution instruction more suitably than the image processor, the message indicating that it is better to execute the image-related process by the second image processor.

13 Claims, 19 Drawing Sheets

FOREIGN PATENT DOCUMENTS

| | | | |
|---|---|---|---|
| JP | 10011242 | * | 1/1998 |
| JP | 2001-125762 | A | 5/2001 |
| JP | 2002-123380 | | 4/2002 |
| JP | 2002-149374 | A | 5/2002 |
| JP | 2002-196915 | | 7/2002 |
| JP | 2002-259100 | | 9/2002 |
| JP | 2003-189041 | | 7/2003 |
| JP | 2003-234870 | A | 8/2003 |
| JP | 2003-330665 | | 11/2003 |
| WO | 03/060689 | A1 | 7/2003 |

* cited by examiner

FIG. 4

MFP(IMAGE FORMING DEVICE) 1A

| | |
|---|---|
| CPU: | A-XXXX |
| RAM: | 32MB |
| AVAILABLE PROTOCOL: | TCP/IP, FTP, SMTP, HTTP, ··· |
| AVAILABLE FUNCTION: | PRINTING ON RECYCLED PAPER, DOUBLE-SIDED PRINTING, ··· |
| RUNNING COST: | PRINTING ON SINGLE-SIDED A4 SIZE PLAIN PAPER =4.0YEN/A PIECE OF PAPER<br>PRINTING ON DOUBLE-SIDED A4 SIZE PLAIN PAPER =5.0YEN/A PIECE OF PAPER<br>PRINTING ON SINGLE-SIDED A4 SIZE RECYCLED PAPER =3.0YEN/A PIECE OF PAPER<br>PRINTING ON DOUBLE-SIDED A4 SIZE RECYCLED PAPER=4.0YEN/A PIECE OF PAPER |
| ⋮ | ⋮ |

70a(70)

MFP(IMAGE FORMING DEVICE) 1B

| | |
|---|---|
| CPU: | A-XXXX |
| RAM: | 64MB |
| AVAILABLE PROTOCOL : | TCP/IP, SMB, FTP, SMTP, ··· |
| AVAILABLE FUNCTION: | PRINTING ON RECYCLED PAPER, DOUBLE-SIDED PRINTING, ··· |
| RUNNING COST: | PRINTING ON SINGLE-SIDED A4 SIZE PLAIN PAPER =3.9YEN/A PIECE OF PAPER<br>PRINTING ON DOUBLE-SIDED A4 SIZE PLAIN PAPER =4.9YEN/A PIECE OF PAPER<br>PRINTING ON SINGLE-SIDED A4 SIZE RECYCLED PAPER =2.9YEN/A PIECE OF PAPER<br>PRINTING ON DOUBLE-SIDED A4 SIZE RECYCLED PAPER =3.8YEN/A PIECE OF PAPER |
| ⋮ | ⋮ |

70b(70)

⋮

DB0

FIG. 5

DB1

IMAGE FORMING DEVICE 1A — 71a(71)

USER ID = 001

| JOB TYPE | NUMBER OF TIMES |
|---|---|
| PRINT | 0 |
| SCAN TO FTP | 3 |
| SCAN TO SMB | 0 |
| SCAN TO BOX | 12 |
| COPY | 20 |
| FAX | 2 |
| BOX | 12 |

USER ID = 002

| JOB TYPE | NUMBER OF TIMES |
|---|---|
| PRINT | 5 |
| SCAN TO FTP | 0 |
| SCAN TO SMB | 0 |
| SCAN TO BOX | 5 |
| COPY | 25 |
| FAX | 3 |
| BOX | 8 |

...

IMAGE FORMING DEVICE 1B — 71b(71)

USER ID = 001

| JOB TYPE | NUMBER OF TIMES |
|---|---|
| PRINT | 40 |
| SCAN TO FTP | 0 |
| SCAN TO SMB | 0 |
| SCAN TO BOX | 13 |
| COPY | 10 |
| FAX | 2 |
| BOX | 12 |

USER ID = 002

| JOB TYPE | NUMBER OF TIMES |
|---|---|
| PRINT | 15 |
| SCAN TO FTP | 2 |
| SCAN TO SMB | 0 |
| SCAN TO BOX | 5 |
| COPY | 35 |
| FAX | 15 |
| BOX | 15 |

...

...

FIG. 6

DB2

IMAGE FORMING DEVICE 1A

ADF ERROR STATE

| ERROR CONTENT | A RATE OF ERRORS |
|---|---|
| PLAIN PAPER SINGLE-SIDED JAM | 1% |
| PLAIN PAPER DOUBLE-SIDED JAM | 80% |
| THICK PAPER SINGLE-SIDED JAM | 0.2% |
| THICK PAPER DOUBLE-SIDED JAM | 80% |

ENGINE ERROR STATE

| ERROR CONTENT | A RATE OF ERRORS |
|---|---|
| PLAIN PAPER SINGLE-SIDED JAM | 0.2% |
| PLAIN PAPER DOUBLE-SIDED JAM | 0.1% |
| THICK PAPER SINGLE-SIDED JAM | 0.3% |
| THICK PAPER DOUBLE-SIDED JAM | 0.3% |

HARD DISK DRIVE USAGE SITUATION

| ATTRIBUTION | SITUATION |
|---|---|
| TOTAL CAPACITY | 10GB |
| PERSONAL BOX ASSIGNED CAPACITY | 4GB |
| PERSONAL BOX FREE SPACE | 3% |
| SYSTEM BOX ASSIGNED CAPACITY | 4GB |
| SYSTEM BOX FREE SPACE | 50% |

⋮

72a(72)

IMAGE FORMING DEVICE 1B

ADF ERROR STATE

| ERROR CONTENT | A RATE OF ERRORS |
|---|---|
| PLAIN PAPER SINGLE-SIDED JAM | 0.1% |
| PLAIN PAPER DOUBLE-SIDED JAM | 0.1% |
| THICK PAPER SINGLE-SIDED JAM | 0.1% |
| THICK PAPER DOUBLE-SIDED JAM | 0.1% |

ENGINE ERROR STATE

| ERROR CONTENT | A RATE OF ERRORS |
|---|---|
| PLAIN PAPER SINGLE-SIDED JAM | 0.2% |
| PLAIN PAPER DOUBLE-SIDED JAM | 50% ··· |
| THICK PAPER SINGLE-SIDED JAM | 0.3% |
| THICK PAPER DOUBLE-SIDED JAM | 60% |

HARD DISK DRIVE USAGE SITUATION

| ATTRIBUTION | SITUATION |
|---|---|
| TOTAL CAPACITY | 80GB |
| PERSONAL BOX FREE SPACE | 40GB |
| PERSONAL BOX FREE SPACE | 98% |
| SYSTEM BOX ASSIGNED CAPACITY | 30GB |
| SYSTEM BOX FREE SPACE | 90% |

⋮

72b(72)

IMAGE PROCESSOR

This application is based on Japanese Patent Application No. 2004-304474 filed on Oct. 19, 2004, the contents of which are hereby incorporated by reference.

BACKGROUND OF THE INVENTION

1. Field of the Invention

The present invention relates to a system including a plurality of image processors such as MFPs and a method for controlling these image processors.

2. Description of the Prior Art

Recently, an image processor such as a copying machine or a printer has become equipped with various functions. For example, an image processor is proposed, which is equipped with the conventional functions including a copier and a network printer as well as other functions including a scanner, a fax and a document server (a box). Such an image processor is called a multifunction device or an MFP (Multi Function Peripherals).

In addition, the image processor such as the MFP can be connected to a plurality of terminal devices via a network, so that plural users can share the image processor. Therefore, if one image processor is installed in a small office, all the members can use a copier, a fax, a scanner, a printer and a data storage. However, in an office of a middle scale or a larger scale, a plurality of image processors is usually installed so that each member can use them smoothly without a waiting time.

A method of using a plurality of image processors efficiently in such an environment is proposed. According to a method described in Japanese unexamined patent publication No. 2003-330665, a plurality of printers is connected to a PC, which controls all performances of the printers and calculates an inclusion relationship of performances of the printers. Then, if a predetermined printer is in a state of being unable to print, the PC searches a printer having functions equal to or higher than the registered functions and notifies the user of the search result.

In an environment where a plurality of image processors is installed, each of most users has tendency to use a specific image processor to which the user is accustomed to use. Therefore, there is a case where a user does not notice that there is an image processor that is more suitable for a process desired by the user than the image processor to which the user is accustomed to use.

However, in the conventional method as described in Japanese unexamined patent publication No. 2003-330665, the user usually cannot know a more suitable image processor for him or her although he or she can know a substitute device when the image processor to which the user is accustomed to use cannot execute the process.

SUMMARY OF THE INVENTION

An object of the present invention is to realize more convenient system and method so that a user can use more suitable image processor more readily than before in an environment where a plurality of image processors is installed.

The image processor according to an aspect of the present invention is an image processor for executing an image-related process that is a process related to an image. The image processor comprises a usage situation storing portion for storing first usage situation information that indicates a usage situation of the image processor, a usage situation information obtaining portion for obtaining second usage situation information that indicates a usage situation of a second image processor for executing the image-related process, a suitable image processor determining portion for determining a second image processor that can execute the image-related process more suitably than the image processor in accordance with the first usage situation information and the second usage situation information when an execution instruction of the image-related process is given by a user, a process execution control portion for controlling so that the execution of the image-related process is suspended in the image processor if it is determined that there is a second image processor that can execute the image-related process of the execution instruction more suitably than the image processor and that the image-related process is executed in the image processor if it is not determined that there is a second image processor that can execute the image-related process of the execution instruction more suitably than the image processor, and a message output portion for delivering a message to the user who issued the execution instruction if it is determined that there is a second image processor that can execute the image-related process of the execution instruction more suitably than the image processor, the message indicating that it is better to execute the image-related process by the second image processor.

According to the present invention, an image processor that is suitable for a user can be used more easily than before in an environment where a plurality of image processors is installed.

BRIEF DESCRIPTION OF THE DRAWINGS

FIG. 4 shows an example of MFP specification information that is stored in a specification database.

FIG. 5 shows an example of job type usage situation information that is stored in a job type usage situation database.

FIG. 6 shows an example of usage result information that is stored in a usage result database.

DESCRIPTION OF THE PREFERRED EMBODIMENTS

Hereinafter, the present invention will be explained more in detail with reference to embodiments and drawings.

Figure 1:
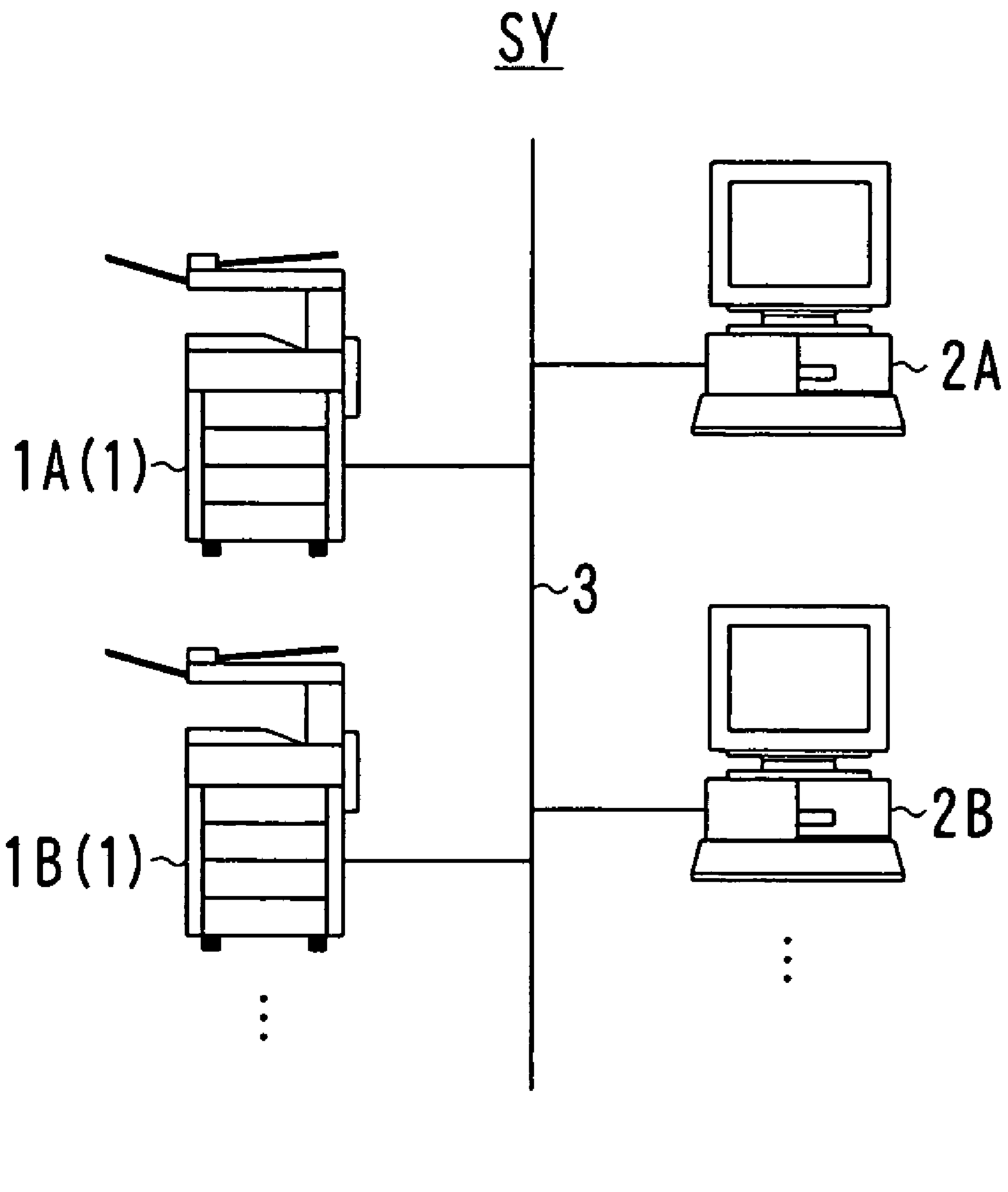
FIG. 1 shows an example of an overall structure of an image-related process system according to the present invention.
Figure 2:
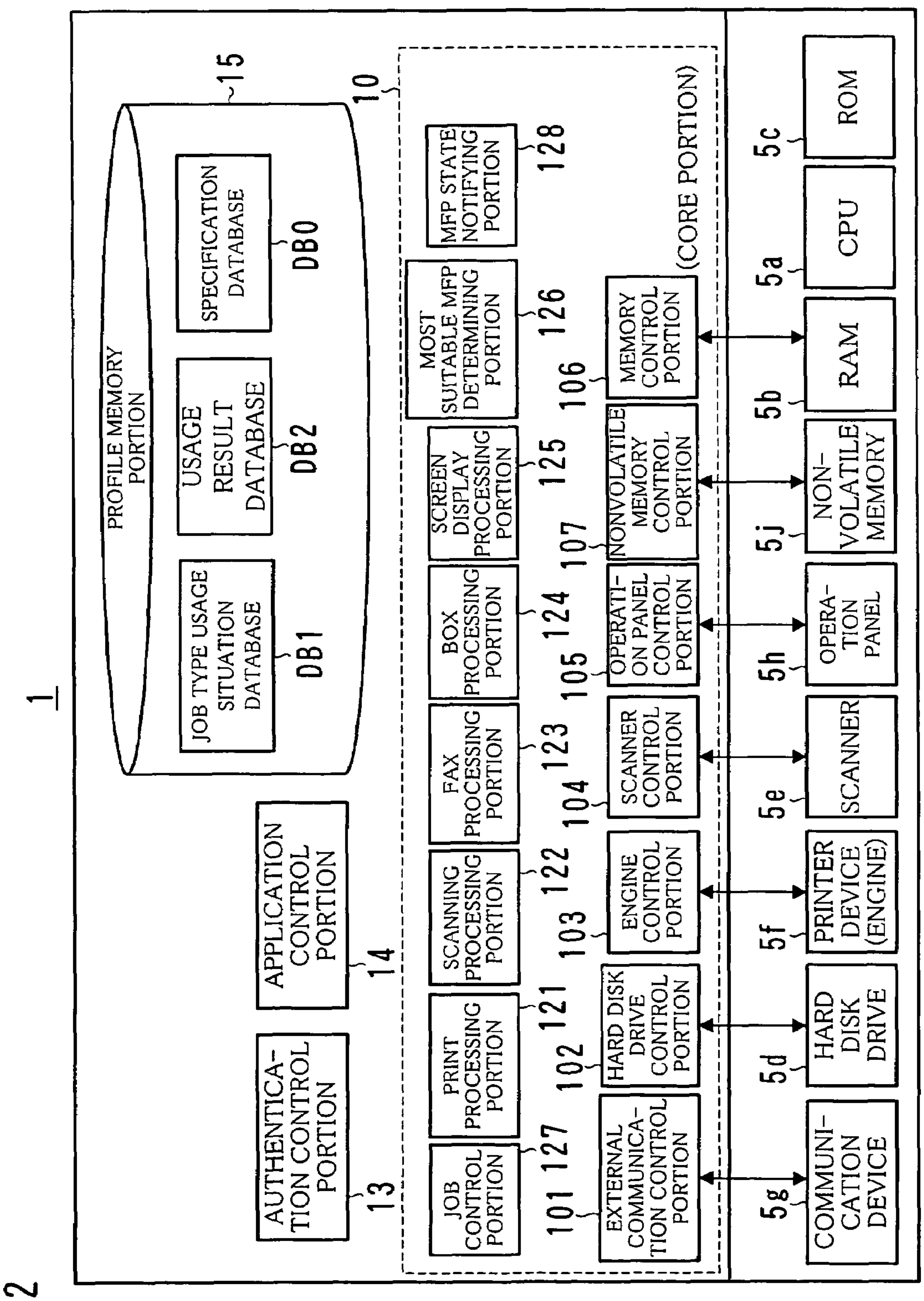
FIG. 2 shows an example of a platform of an image forming device.
Figure 3:
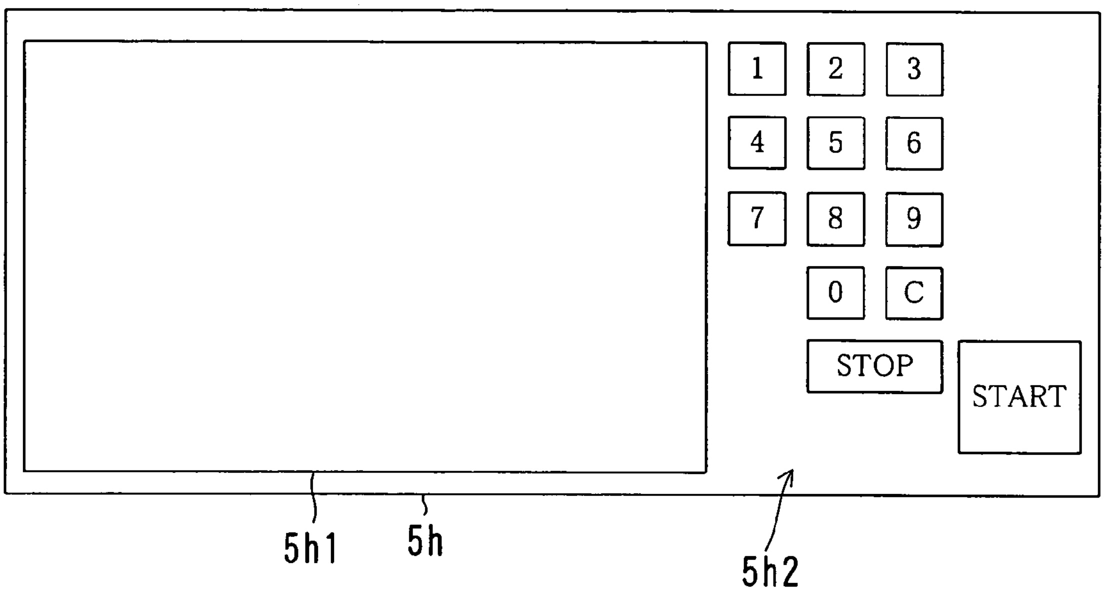
FIG. 3 shows an example of a structure of an operation panel.

FIG. 1 shows an example of an overall structure of an image-related process system SY according to the present invention, FIG. 2 shows an example of a platform of an image forming device 1, FIG. 3 shows an example of a structure of an operation panel 5*h*.

The image-related process system SY according to the present invention includes a plurality of image forming devices 1A, 1B, . . . , a plurality of terminal devices 2A, 2B, . . . and a communication line 3 as shown in FIG. 1. These devices are connected to each other via the communication line 3. As the communication line 3, a LAN, the Internet, a public telephone line or a private line can be used. In the following description, the image forming devices 1A, 1B, . . . may be referred to as an "image forming device 1" in general, and the terminal device 2A, 2B, . . . may be referred to as a "terminal device 2" in general.

In the terminal device 2, there is installed a driver for controlling the image forming device 1 as well as a program for performing a process linking with the image forming device 1. As the terminal device 2, a personal computer or a workstation can be used.

The image forming device 1 is a device that has integrated functions including a copier, a network printer, a scanner, a fax and a document server. It may be called a multifunction device or an MFP (Multi Function Peripherals). A function of the document server may be called a "box function" or a "personal box function" because it provides a storage area that is called a "box" or a "personal box" for each user. By this function, each user can store files in his or her box.

The image forming device 1 has hardware that includes a CPU 5*a*, a RAM 5*b*, a ROM 5*c*, a hard disk drive 5*d*, a scanner 5*e*, a printer device (engine) 5*f*, a communication device 5*g*, an operation panel 5*h*, a nonvolatile memory 5*j* and various control circuit as shown in FIG. 2.

The scanner 5*e* is a device that reads images such as photographs, characters, pictures or charts on a sheet of paper of an original (hereinafter, may be simply referred to as an "original" in an optical manner and produces an image data. The printer device 5*f* is a device that prints images read by the scanner 5*e* or images of image data that are received from the terminal device 2 or the like.

The operation panel 5*h* includes a display device 5*h* 1 and an operation button unit 5*h*2 having a plurality of operation buttons as shown in FIG. 3.

The operation button unit 5*h*2 includes a plurality of keys for entering numbers, characters, symbols or the like, a sensor for recognizing a pressed key and a transmission circuit for sending a signal indicating a recognized key to the CPU 5*a*.

The display device 5*h*1 displays a screen for giving a message or an instruction to a user who operates this image forming device 1, a screen for the user to enter setting information and process information, and a screen for showing an image produced by the image forming device 1 and a result of a process, etc. In this embodiment, a touch panel is used as the display device 5*h*1. Therefore, the display device 5*h*1 has a function of detecting a position on the touch panel where the user touched with finger and sending a signal that indicates the detection result to the CPU 5*a*.

In this way, the operation panel 5*h* plays a role as a user interface for a user who operates the image forming device 1 directly.

The communication device 5*g* shown in FIG. 2 is a device for communicating with the terminal device 2. As the communication device 5*g*, an NIC (Network Interface Card), a modem or a TA (Terminal Adapter) can be used.

The nonvolatile memory 5*j* is a memory such as an EEPROM or a flash memory in which data can be rewritten and are nonvolatile. The ROM 5*c* is a read only memory. Although a ROM is one type of the nonvolatile memory in general, the EEPROM or the flash memory is distinguished from the ROM in this embodiment, so that the former is referred to as a "nonvolatile memory 5*j*" and the latter is referred to as a "ROM 5*c*".

In the hard disk drive 5*d*, there is installed a program as well as data for realizing functions of a core portion 10, an authentication control portion 13, an application control portion 14 and a profile memory portion 15 as shown in FIG. 2. It is possible to store a part or the entire of the program or the data in the nonvolatile memory 5*j* or the ROM 5*c*. The program is executed by the CPU 5*a*. Alternatively, it is possible to realize a part or the entire of the functions not by software but by hardware such as a processor (a control circuit).

FIG. 4 shows an example of MFP specification information 70 that is stored in the specification database DB0, FIG. 5 shows an example of job type usage situation information 71 that is stored in a job type usage situation database DB1, FIG. 6 shows an example of usage result information that 72 is stored in a usage result database DB2.

Hereinafter, processes of the portions shown in FIG. 2 will be described in detail. The core portion 10 includes an external communication control portion 101, a hard disk drive control portion 102, an engine control portion 103, a scanner control portion 104, an operation panel control portion 105, a memory control portion 106, a nonvolatile memory control portion 107, a print processing portion 121, a scanning processing portion 122, a fax processing portion 123, a box processing portion 124, a screen display processing portion 125, a most suitable MFP determining portion 126, a job control portion 127 and an MFP state notifying portion 128.

The external communication control portion 101 through the nonvolatile memory control portion 107 control hardware of the image forming device 1 directly. Namely, it plays a role as a hardware controller. The external communication control portion 101 controls the communication device 5*g*, the hard disk drive control portion 102 controls the hard disk drive 5*d*, the engine control portion 103 controls the engine of the printer device 5*f*, the scanner control portion 104 controls the scanner 5*e*, the operation panel control portion 105 controls the operation panel 5*h*, the memory control portion 106 controls the RAM 5*b*, and the nonvolatile memory control portion 107 controls the nonvolatile memory 5*j*.

The print processing portion 121 through the screen display processing portion 125 control the external communication control portion 101 through the nonvolatile memory control portion 107 so as to realize a basic function of the image forming device 1.

The print processing portion 121 controls the external communication control portion 101, the memory control portion 106 and the engine control portion 103 so as to receive print data from the terminal device 2 and to perform the printing process. The scanning processing portion 122 controls the scanner control portion 104 and the memory control portion 106 so as to read images of an original that is set on an original glass plate of the scanner 5*e* and to produce image data.

The fax processing portion 123 controls the external communication control portion 101, the scanner control portion 104 and the memory control portion 106 so as to call a designated fax number and to send image data by fax of an image of an original that is set on the original glass plate of the scanner 5*e* if the user wants the fax transmission. When receiving a fax signal from other device, it controls the external communication control portion 101, the engine control portion 103 and the memory control portion 106 so as to start receiving fax data and to print the image on a sheet of paper.

The box processing portion 124 controls the hard disk drive control portion 102 and the memory control portion 106 so as to store a file in the box, change a name or other attribution of a file that is stored in the box, retrieve a file that is stored in the box to the RAM 5*b*, revising the same or erasing the same. The screen display processing portion 125 controls the operation panel control portion 105 so as to display a screen that corresponds to an operation by the user or a current process situation in the image forming device 1.

The most suitable MFP determining portion 126 performs a process for determining a most suitable image forming device 1 for performing a process (a job) designated by the user among the image forming devices 1 that are provided to the image-related process system SY.

The job control portion 127 controls the print processing portion 121 through the screen display processing portion 125 so as to retrieve jobs waiting in a queue one by one and to execute the jobs. Note that a job history (a log) of the job is saved after performing the job. The job history includes a type of the job, contents of the process, a result of the execution (success or fail), ID information (a user ID) of the user who issued the instruction and information about a cause of fail if it happened.

The MFP state notifying portion 128 notifies an administrator or a person who is in charge of maintenance of information about a state of the image forming device 1 so that users can use the image forming device 1 more efficiently.

The authentication control portion 13 performs authentication about whether or not the user who wants to use the image forming device 1 is a regular user. The application control portion 14 performs a process for controlling the application program, which includes retrieving an application program that is necessary for performing the job from the hard disk drive 5 *d* to the RAM 5*b* and activating the application program, or removing an unnecessary application program from the RAM 5*b* after closing the same.

The profile memory portion 15 stores the specification database DB0, the job type usage situation database DB1 and the usage result database DB2, so as to manage a profile that is information about a specification and a usage situation of each image forming device 1.

The specification database DB0 stores the MFP specification information 70*a*, 70*b*, . . . of the image forming devices 1A, 1B, . . . as shown in FIG. 4. Hereinafter, the MFP specification information 70*a*, 70*b*, . . . may be referred to as "MFP specification information 70" in general. The MFP specification information 70 indicates of the specification of the image forming device 1 such as a type of the CPU 5*a*, a storage capacity of the RAM 5*b*, an available protocol, functions and a running cost.

The job type usage situation database DB1 stores the job type usage situation information 71*a*, 71*b*, . . . of the image forming devices 1A, 1B, . . . as shown in FIG. 5. Hereinafter, the job type usage situation information 71*a*, 71*b*, . . . may be referred to as "job type usage situation information 71" in general. The job type usage situation information 71 indicates what type of job was performed how many times during a predetermined period (for example, during a period since a month before until the present) by the image forming device 1 in accordance with instructions of each user.

A job type of "PRINT" indicates a job for printing a document in accordance with document data sent from the terminal device 2 (a network printing job). A job type of "SCAN TO FTP" indicates a job for sending image data of an image of an original read by the scanner 5*e* to any one of the terminal devices 2 by FTP (File Transfer Protocol). A job type of "SCAN TO SMB" indicates a job for sending image data of an image of an original read by the scanner 5*e* to any one of the terminal devices 2 by SMB (Server Message Block) protocol. A job type of "SCAN TO BOX" indicates a job for storing image data of an image of an original read by the scanner 5*e* in any one of boxes in the same image forming device 1.

A job type of "copy" indicates a job for printing an image of an original read by the scanner 5*e* on a sheet of paper. A job type of "fax" indicates a job for sending data of an image of an original read by the scanner 5*e* as fax data to a fax terminal or other MFP. A job type of "box" indicates a job for using data (such as an image file) stored in the box for printing or file transmission.

The usage result database DB2 stores the usage result information 72*a*, 72*b*, . . . of the image forming devices 1A, 1B, . . . as shown in FIG. 6. Hereinafter, the usage result information 72*a*, 72*b*, . . . may be referred to as "usage result information 72" in general. The usage result information 72 indicates what type of trouble such as an error or a malfunction (hereinafter simply referred to as an "error") has happened in the image forming device 1 when the job was executed, and what state resources of the image forming device 1 have become when the job was executed.

A table of "ADF error state" indicates information about a rate of errors that have occurred in an automatic document feeder (ADF) of the scanner 5*e* during a predetermined period (for example, a period since a month ago until the present). An "error content" indicates a specific state of the error. For example, a "plain paper single-sided jam" indicates a jam (a paper jam) that occurred when feeding a plain-paper and single-sided original (an original on a single side of a sheet of paper) to an original glass of an original reading portion, while a "thick paper double-sided jam" indicates a jam that occurred when feeding a double-sided original (an original on both sides of a sheet of paper) of a thick paper.

A table of an "engine error state" indicates information about a rate of errors that have occurred in the engine of the printer device 5*f* during a predetermined period. Similarly to the ADF error state, the "error content" indicates a specific state of the error. For example, "plain paper single-sided jam" indicates a jam that occurred in the paper feeding portion when performing single-sided printing on a sheet of plain paper (printing an image on a single side of a sheet of paper).

A table of a "hard disk drive usage situation" indicates information about a specification and a usage situation of the hard disk drive 5*d* of the image forming device 1. A "total capacity" indicates a total storage capacity of the entire hard disk drive 5*d* that is provided to the image forming device 1. A "personal box assigned capacity" is a capacity that is assigned to the box of each user. A "personal box free space" indicates a ratio of a free space of the personal box to the total storage capacity. A "system box assigned capacity" indicates a storage capacity assigned to a system box in the hard disk drive 5*d*. A "system box free space" indicates a ratio of a free space of the system box to the total storage capacity.

In this way, the job type usage situation information 71 of each image forming device 1 that is stored in the job type usage situation database DB1 indicates a usage situation of each type of job for each user in the image forming device 1. In addition, the usage result information 72 of each image forming device 1 stored in the usage result database DB2 indicates a state of an error that occurred when the image forming device 1 is used and a state after the use.

The job type usage situation information 71 and the usage result information 72 of each image forming device 1 can be generated by summarizing each job history, the MFP specification information 70 and information about a state of the hard disk drive 5*d* obtained from the hard disk drive control portion 102. In addition, they are updated if necessary every time when the job is executed. For example, the job type usage situation information 71*a* and the usage result information 72*a* of the image forming device 1A are generated or updated in accordance with the job history of the image forming device 1A, the MFP specification information 70 and the information about the state of the hard disk drive 5*d*. In the image forming device 1A, the job type usage situation information 71 and the usage result information 72 of other image forming device 1 are received from the other image forming device 1 if necessary.

Furthermore, the profile memory portion 15 includes a database that stores information of a user profile about a user ID and a password of each user.

Figure 7:
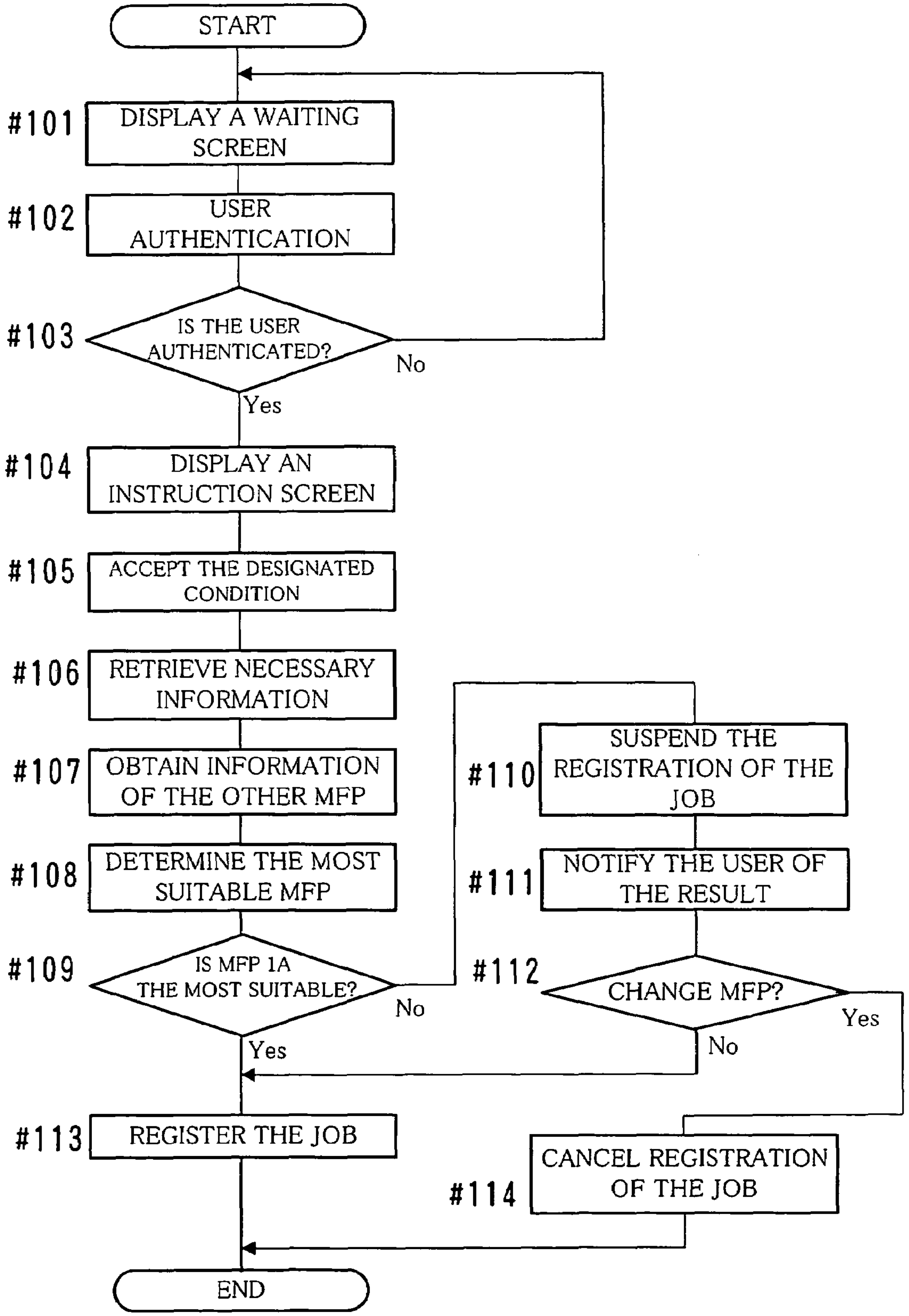
FIG. 7 is a flowchart showing an example of a flow of a process in the image forming device when it performs a copy job.
Figure 8:
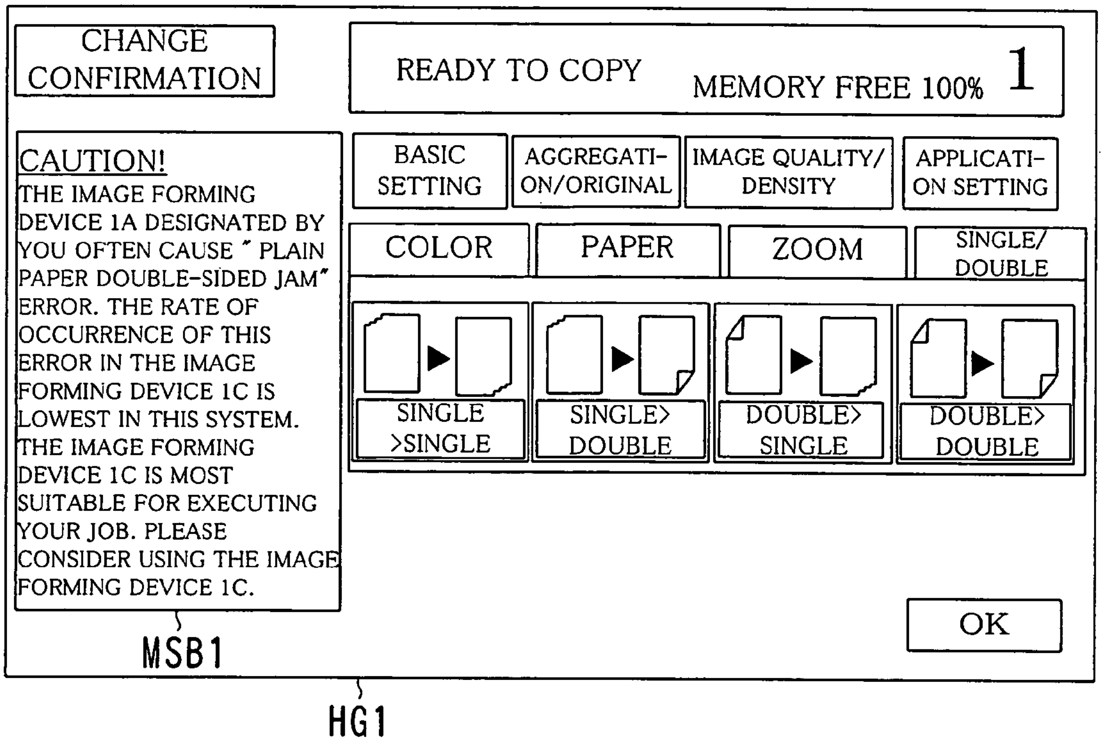
FIG. 8 shows an example of an instruction screen.
Figure 9:
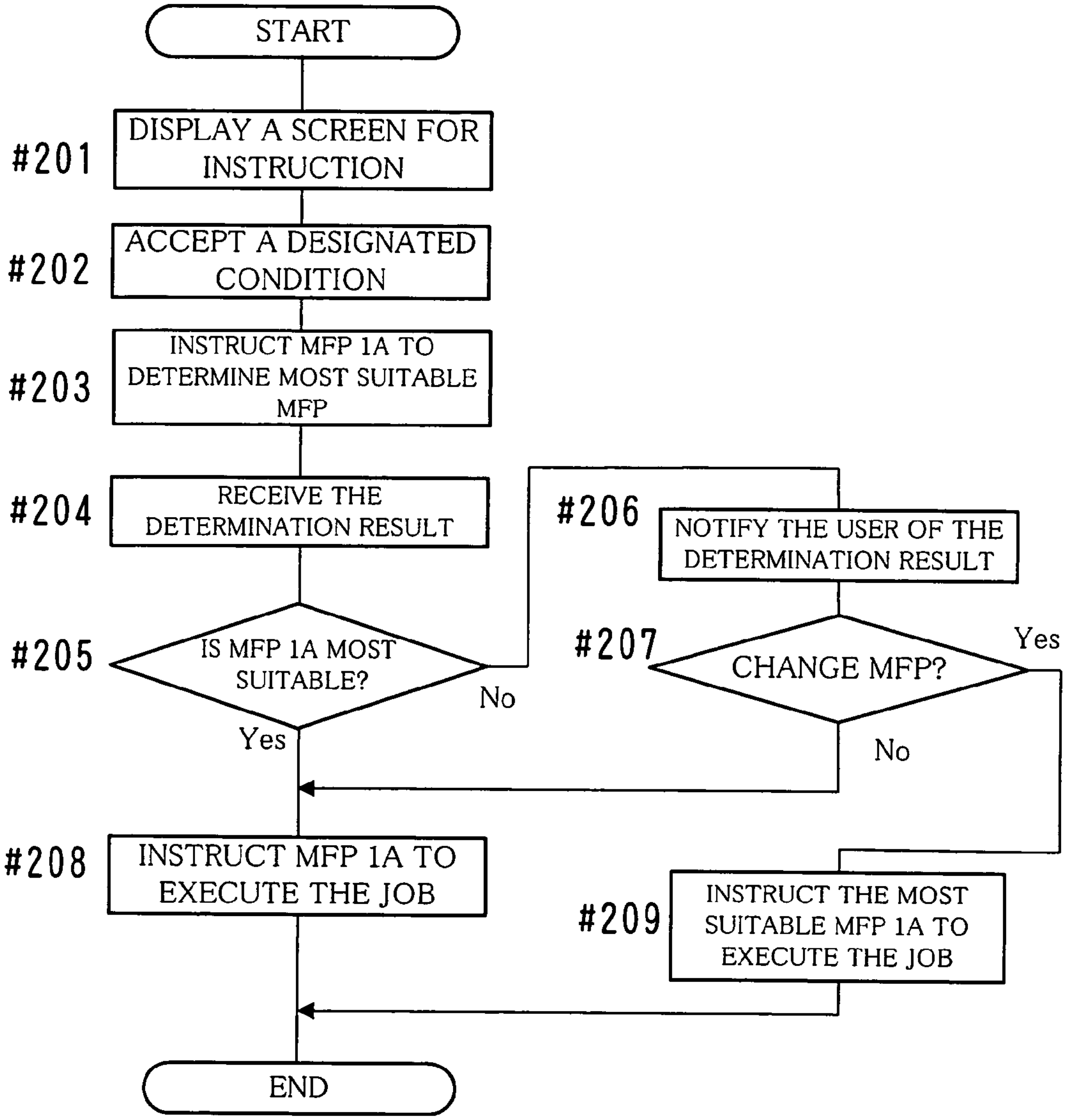
FIG. 9 is a flowchart showing an example of a flow of a process in a terminal device when it instructs a print job.
Figure 10:
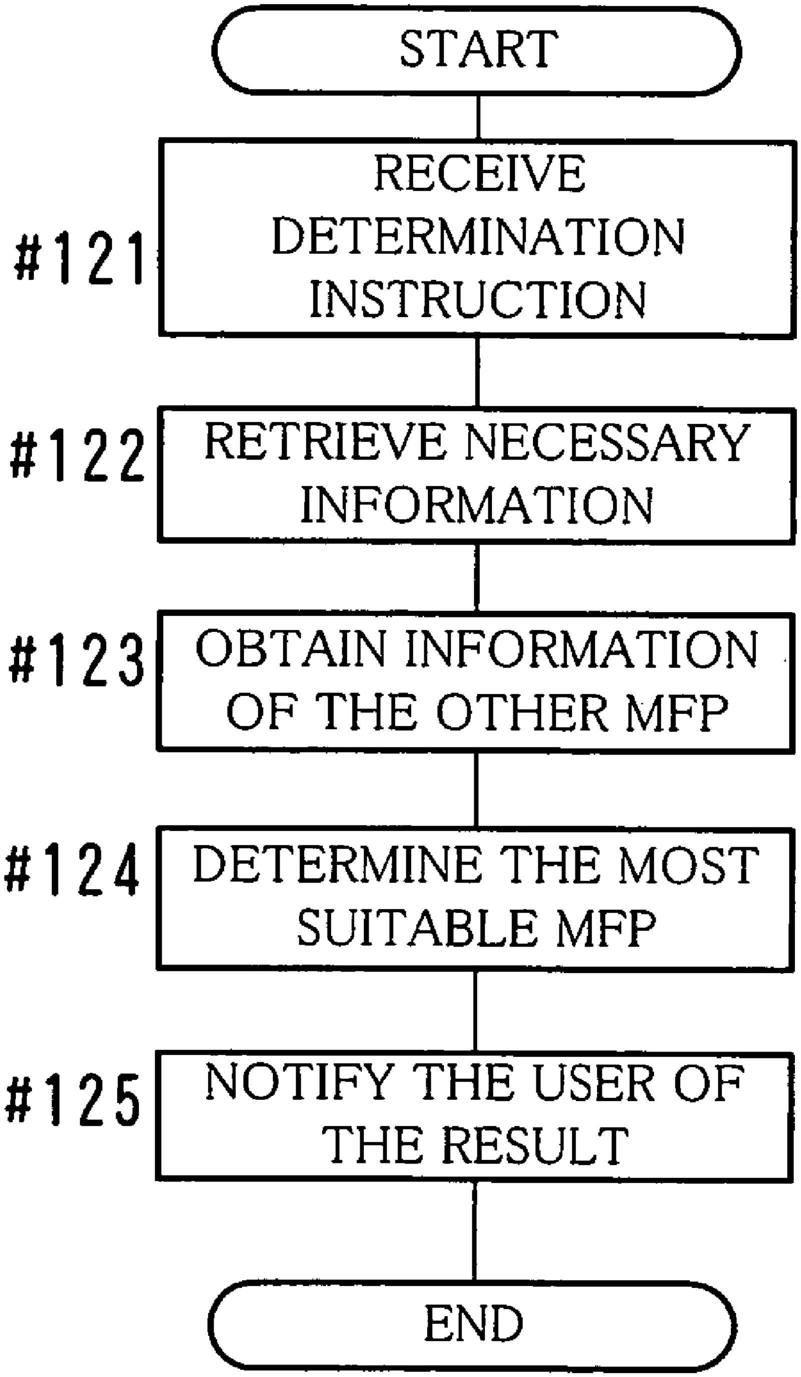
FIG. 10 is a flowchart showing an example of a flow of a process in the image forming device when it determines a subject that is suitable for performing a print job.
Figure 11:
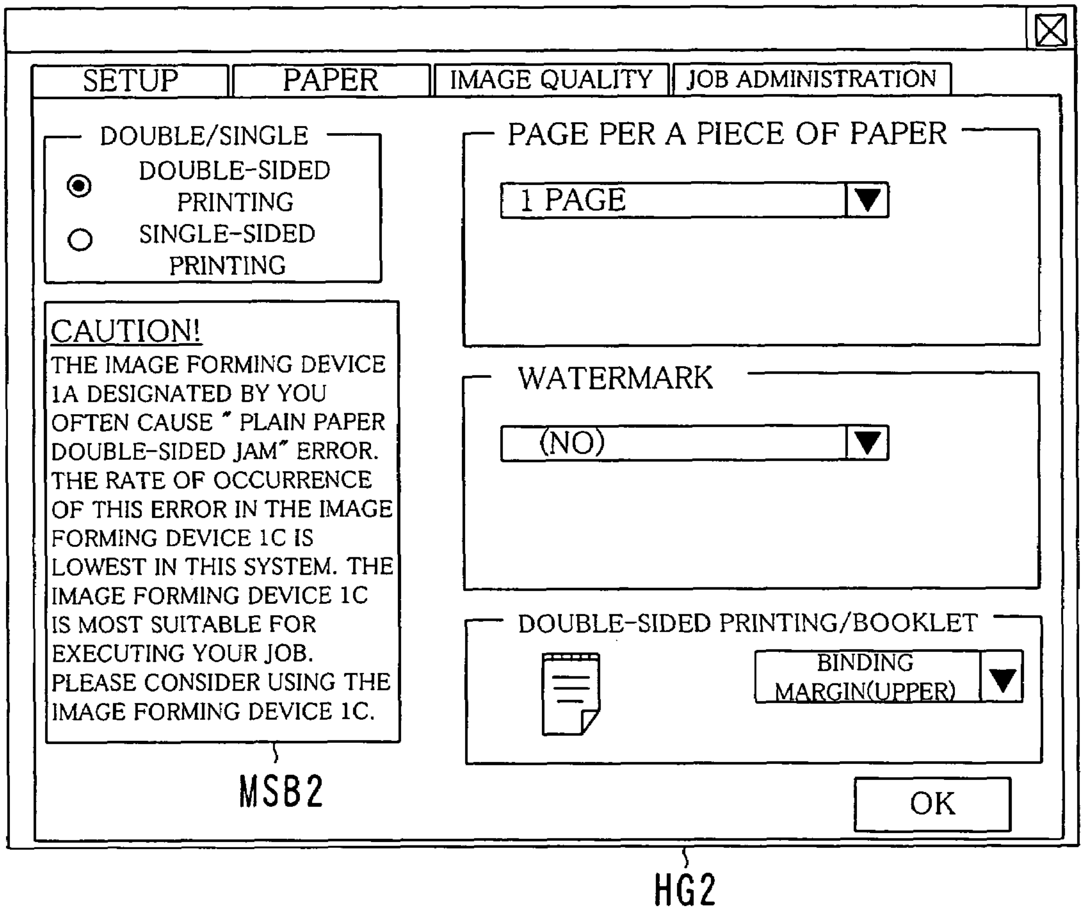
FIG. 11 shows an example of a driver screen.
Figure 12:
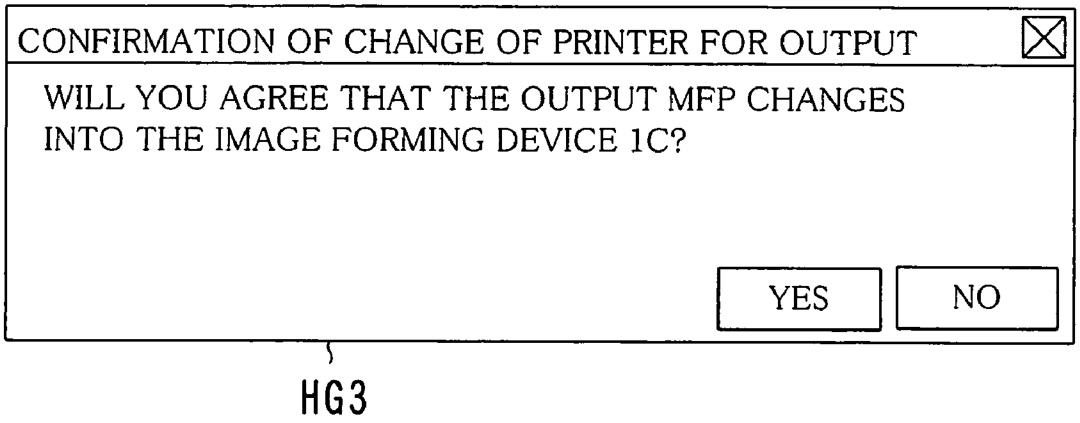
FIG. 12 shows an example of a change confirmation screen.
Figure 13:
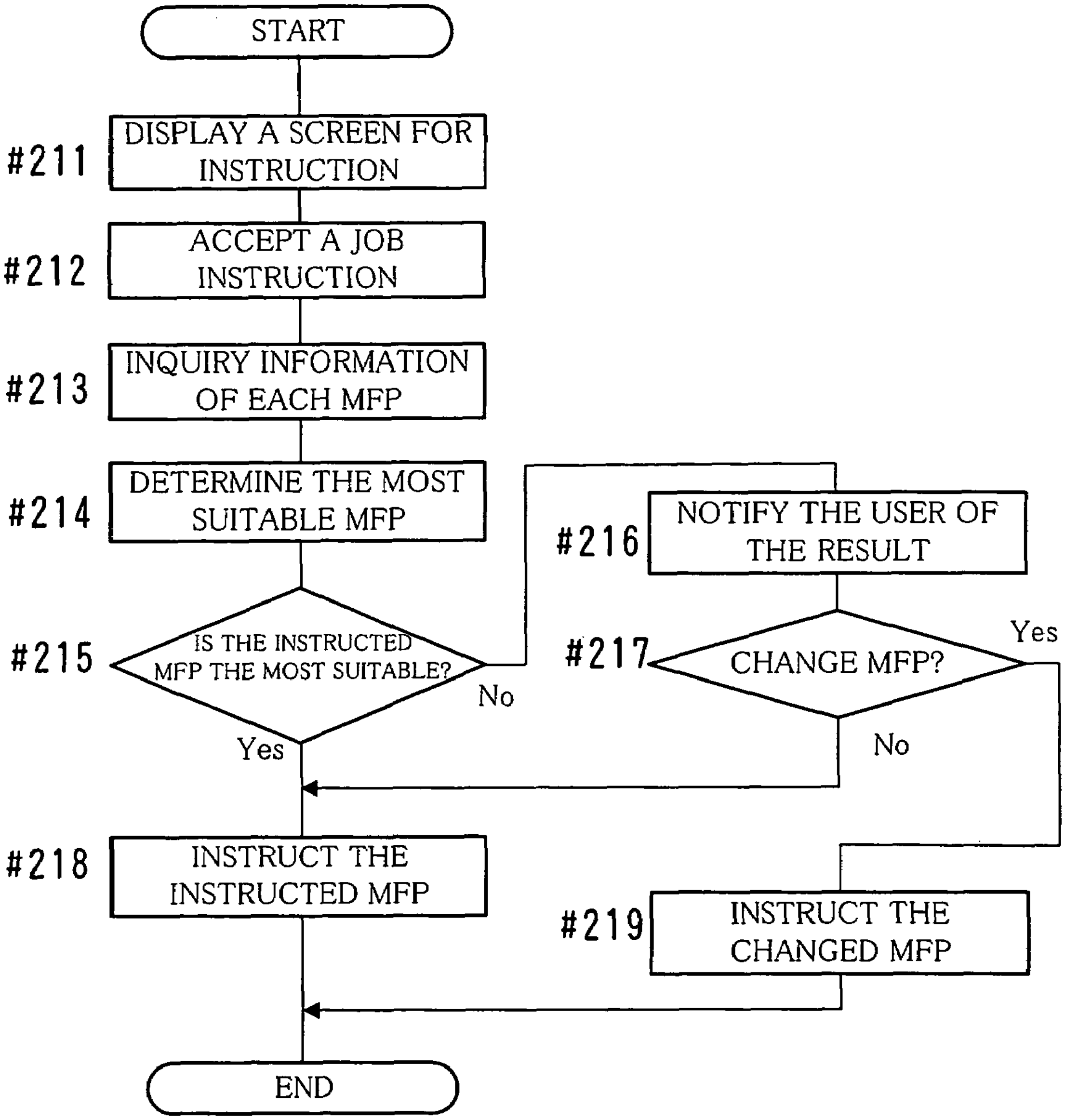
FIG. 13 is a flowchart showing a variation of a flow of a process in the terminal device when it instructs a print job.

FIG. 7 is a flowchart showing an example of a flow of a process in the image forming device 1 when it performs a copy job, FIG. 8 shows an example of a instruction screen HG1, FIG. 9 is a flowchart showing an example of a flow of a process in a terminal device 2 when it instructs a print job, FIG. 10 is a flowchart showing an example of a flow of a process in the image forming device 1 when it determines a subject that is suitable for performing a print job, FIG. 11 shows an example of a driver screen HG2, FIG. 12 shows an example of a change confirmation screen HG3, and FIG. 13 is a flowchart showing a variation of a flow of a process in the terminal device 2 when it performs a "SCAN TO BOX" job.

Next, flows of processes in the image forming device 1 and the terminal device 2 when performing various types of jobs will be described with reference to flowcharts and so on.

When a user wants the image forming device 1 to perform a job, the user operates the operation panel 5*h* or the terminal device 2 so as to instruct the image forming device 1 in accordance with a type of the job. When receiving the instruction, the image forming device 1 executes the job if it is determined that executing the job of the instruction by itself is most suitable.

When the copy job of an original is executed, a process for the job is executed in the procedure as shown in the flowchart in FIG. 7.

The user decides the image forming device 1 to be used for copying the original and visits the place where the image forming device 1 is placed. For example, it is supposed that the user decided to use the image forming device 1A. The screen display processing portion 125 of the image forming device 1A displays a screen for entering a user ID and a password as a waiting screen on the display device 1*h*1 if nobody is operating the image forming device 1A directly (#101). The user operates the operation button unit 1*h*2 for entering his or her user ID and password.

Then, the authentication control portion 13 performs the authentication process in accordance with the entered user ID and password (#102). Namely, the entered user ID is used as a search key for searching a user profile of the user. When the user profile is found, the entered password is verified with a password indicated in the user profile. Then, if they are identical to one another, an authentication indicating that the user is a regular user is issued (Yes in #103). Thus, the user has logged in the image forming device 1. If the user profile corresponding to the entered user ID is not found or if the passwords are not identical to one another (No in #103), the user cannot log in the image forming device 1.

When the log-in process is finished, the screen display processing portion 125 displays the instruction screen HG1 as shown in FIG. 8 (#104). A message box MSB1 on the screen is an area for notifying the user of a caution or an advice. When the instruction screen HG1 has just been displayed, no special message is displayed in this message box MSB1.

Here, the user designates a condition for the copy job (namely, what type of original should be copied in what way) by pressing a button or by other method. Although a "double-sided/single-sided" tab is selected in the example shown in FIG. 8, here the user designates that the original to be processed is a double-sided original or a single-sided original, and that it is printed on a single side or double sides of a sheet of copying paper. If the user wants to designate a type of paper of the original and a type of copying paper of, the user presses a "paper" tab to switch the screen for designating them. After designating the condition, the user presses the "OK" button.

Then, the most suitable MFP determining portion 126 accepts the designated condition (#105) and starts the process for determining the image forming device 1 that is most suitable for performing the copying process under the condition. First, the most suitable MFP determining portion 126 retrieves the usage result information 72*a* (see FIG. 6) of the image forming device 1A (#106) and accesses other image forming devices 1 (1B, . . . ) that are provided to the image-related process system SY so as to obtain the usage result information 72 (72B, . . . ) of each of them (#107). Namely, the most suitable MFP determining portion 126 inquires them about situations of the usage results.

The most suitable MFP determining portion 126 extracts a result of the job that was executed before under the same condition as the designated condition from the usage result information 72 (71*a*, 71B, . . . ). For example, it is supposed that the user designated to copy a plain paper and double-sided original on both sides of a sheet of plain paper. In this case, the most suitable MFP determining portion 126 extracts a rate of occurrence of the "plain paper double-sided jam" in the ADF error state in each of the usage result information 72, and it also extracts a rate of occurrence of the "plain paper double-sided jam" in the engine error state.

Then, the most suitable MFP determining portion 126 determines the image forming device 1 that is most suitable for executing the job in accordance with the extracted rate of occurrence as follows (#108). Namely, the most suitable MFP determining portion 126 compares the rates of occurrence between the ADF errors of the usage result information 72 so as to extract the image forming device 1 in which the rate of occurrence of the ADF error is lowest. At the same time, the most suitable MFP determining portion 126 compares the rates of occurrence between the engine errors so as to extract the image forming device 1 in which the rate of occurrence of the engine error is the lowest. If the both results are identical to one another, the most suitable MFP determining portion 126 determines that the image forming device 1 is most suitable for executing the job this time. If the both results are not identical to one another, the most suitable MFP determining portion 126 determines that the image forming device 1 in which a sum value of the rate of occurrence of the ADF error and the rate of occurrence of the engine error is lowest is the most suitable image forming device 1, for example.

If the most suitable MFP determining portion 126 determines that the most suitable image forming device 1 is the image forming device 1A it self (Yes in #109), it generates job data of the job for copying under the condition designated by the user and registers the job data in the queue of the image forming device 1A itself (#113). Thus, the job of the instruction is executed by the image forming device 1A.

On the other hand, if the most suitable MFP determining portion 126 determines that another image forming device 1 is most suitable (No in #109), it suspends the registration of the job (#110) and displays a message that indicates the result of the determination in the message box MSB1 for notifying the user as shown in FIG. 8 (#111).

If the user wants to the other image forming device 1 that was determined to be most suitable to perform the job, the user cancels the instruction. Then (Yes in #112), registration of the job in the queue is stopped (#114).

Furthermore, in the case of a job for printing a document of a text or an image that was created by the terminal device 2, the process for executing the job is performed in the procedure as shown in the flowcharts in FIGS. 9 and 10.

The user operates the terminal device 2 for designating the document to be printed and the image forming device 1 that prints the document and enters a printing command. On this occasion, the user designates the image forming device 1 for printing. For example, it is supposed that the image forming device 1A is designated for printing.

Then, the terminal device 2 activates a driver of the image forming device 1A so as to display the driver screen HG2 as shown in FIG. 11 (#201). However, if the user has not logged in the image forming device 1A, the screen for entering a user ID and a password is displayed prior to the display of the driver screen HG2, and input of them is required. The terminal device 2 sends the entered user ID and password to the image forming device 1A and requests for the user authentication. Then, the terminal device 2 displays the driver screen HG2 if the user authentication is obtained, but it refuses the user to use the image forming device 1A if the user authentication is not obtained. Note that when the driver screen HG2 has just been displayed, no special message is displayed in the message box MSB2.

Here, user designates a condition for printing (namely, what type of paper should be used and in what way the document should be printed). Although a "setup" tab is selected in the example shown in FIG. 11, here the user designates that the document should be printed on both sides or on a single side of a sheet of paper. If the user wants to designate a type of paper to be used for printing, the user presses a "paper" tab to switch the screen, where the designation can be made. After designating the condition, the user clicks the "OK" button.

Then, the terminal device 2 accepts the designated condition (#202) and instructs the image forming device 1A to determine the image forming device 1 that is most suitable for executing the printing process under the condition (#203).

When the most suitable MFP determining portion 126 of the image forming device 1A receives the instruction from terminal device 2 (#121 in FIG. 10), it retrieves the usage result information 72*a* (see FIG. 6) of the image forming device 1A itself (#122) and obtains the usage result information 72 (72B, . . . ) of other image forming devices 1 (1B, . . . ) (#123). Namely, the most suitable MFP determining portion 126 inquires about the situation of the usage result.

Although the most suitable MFP determining portion 126 determines the most suitable image forming device 1 by checking both the rate of occurrence of the ADF error and the rate of occurrence of the engine error in the case of the copy job described above with reference to FIG. 7, it determines the most suitable image forming device 1 by checking the rate of occurrence of the engine error of each of the image forming devices 1 in the print job this time because the ADF is not used (#124). Namely, the most suitable MFP determining portion 126 determines that the image forming device 1 in which the rate of occurrence of the engine error is lowest is most suitable. Then, the result of determination is sent to the terminal device 2 that issued the instruction (#125).

When the terminal device 2 received the determination result (#204 in FIG. 9), it checks whether or not the image forming device 1A is included in the determination result (#205). If the image forming device 1A is indicated in the determination result, i.e., if it is determined that the image forming device 1A is most suitable (Yes in #205), the terminal device 2 instructs the image forming device 1A to execute the job that was received in Step #202 (#208).

On the other hand, if the other image forming device 1 is indicated (No in #205), the terminal device 2 displays and notifies the user that the other image forming device 1 is most suitable in the message box MSB1 as shown in FIG. 11 (#206). Here, when the user clicks the "OK" button again, the terminal device 2 displays the change confirmation screen HG3 as shown in FIG. 12. If the user clicks a "No" button (No in #207), the terminal device 2 instructs the image forming device 1A to execute the job as the user selected first (#208). If the user clicks a "Yes" button (Yes in #207), the terminal device 2 instructs the image forming device 1 that was determined to be most suitable instead of the image forming device 1A in the determination process shown in FIG. 10 to execute the job (#209).

Then, the image forming device 1A or the other image forming device 1 that was instructed to execute the job generates job data of the job and registers the job in the queue. The job is executed when it comes the job's turn.

It is possible to determine the image forming device 1 that is most suitable for executing the print job by the terminal device 2 instead of the image forming device 1 that the user designated first (in the above example, the image forming device 1A). In this case, the function corresponding to the most suitable MFP determining portion 126 shown in FIG. 2 may be provided to the terminal device 2, and the process may be executed in the procedure as shown in FIG. 13.

Namely, when the terminal device 2 accepts the designated job on the driver screen HG2 as shown in FIG. 11 (#211, #212), it accesses the image forming device 1A as well as the other image forming device 1 so as to obtain usage result information 72 of them (#213). Then, the terminal device 2 checks the rate of occurrence of the engine error indicated in the obtained usage result information 72 and determines that the image forming device 1 having the lowest value of the rate of occurrence of the engine error is lowest is most suitable (#214). The process of steps #215-#219 is the same as the Steps #205-#209 as shown in FIG. 9, so the description is omitted.

According to the example described above, the image forming device 1 that has higher reliability and is suitable for executing the job instructed by the user can be introduced, it is convenient for the user.

Figure 14:
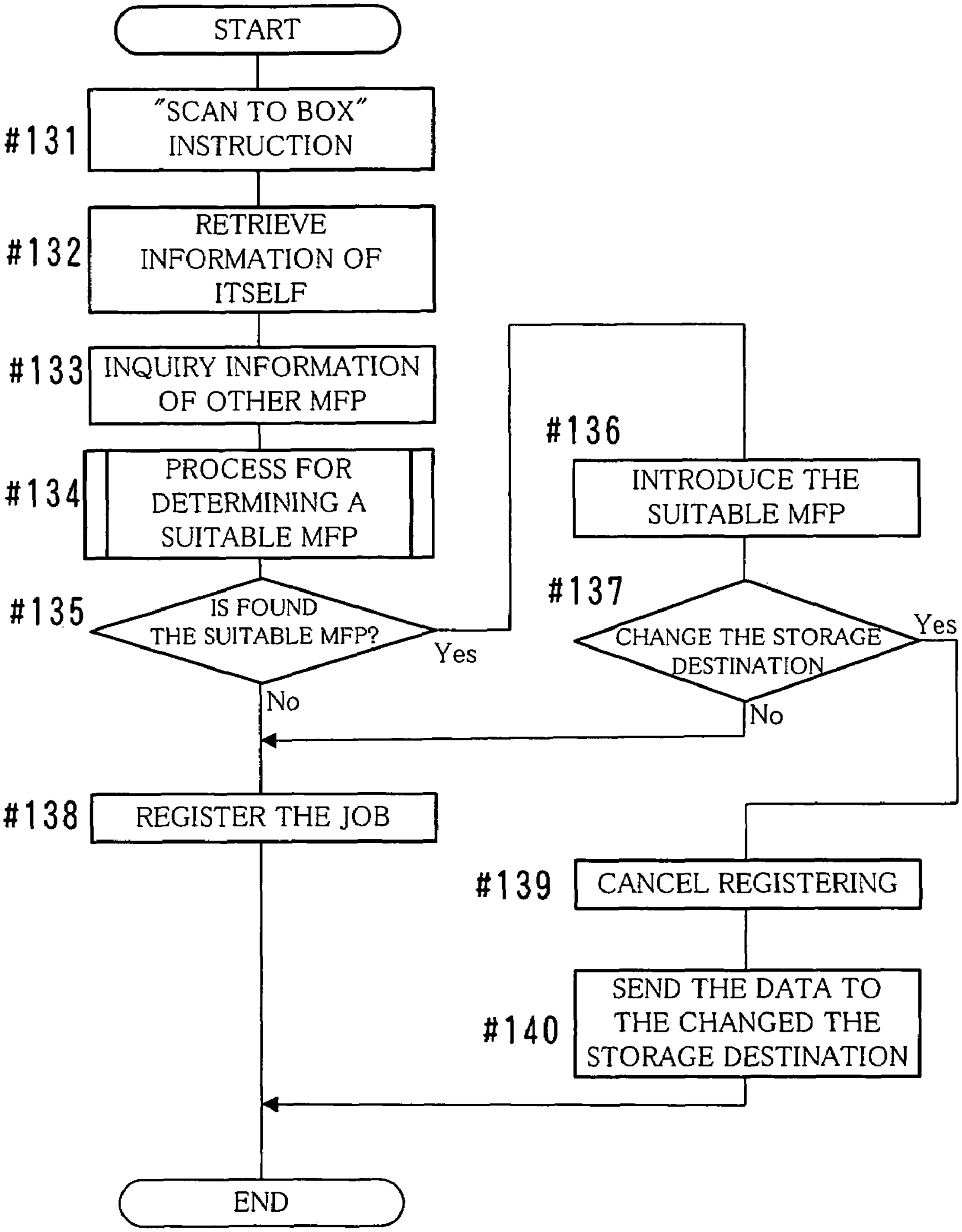
FIG. 14 is a flowchart showing an example of a flow of a process in the image forming device when it performs a "SCAN TO BOX" job.
Figure 15:
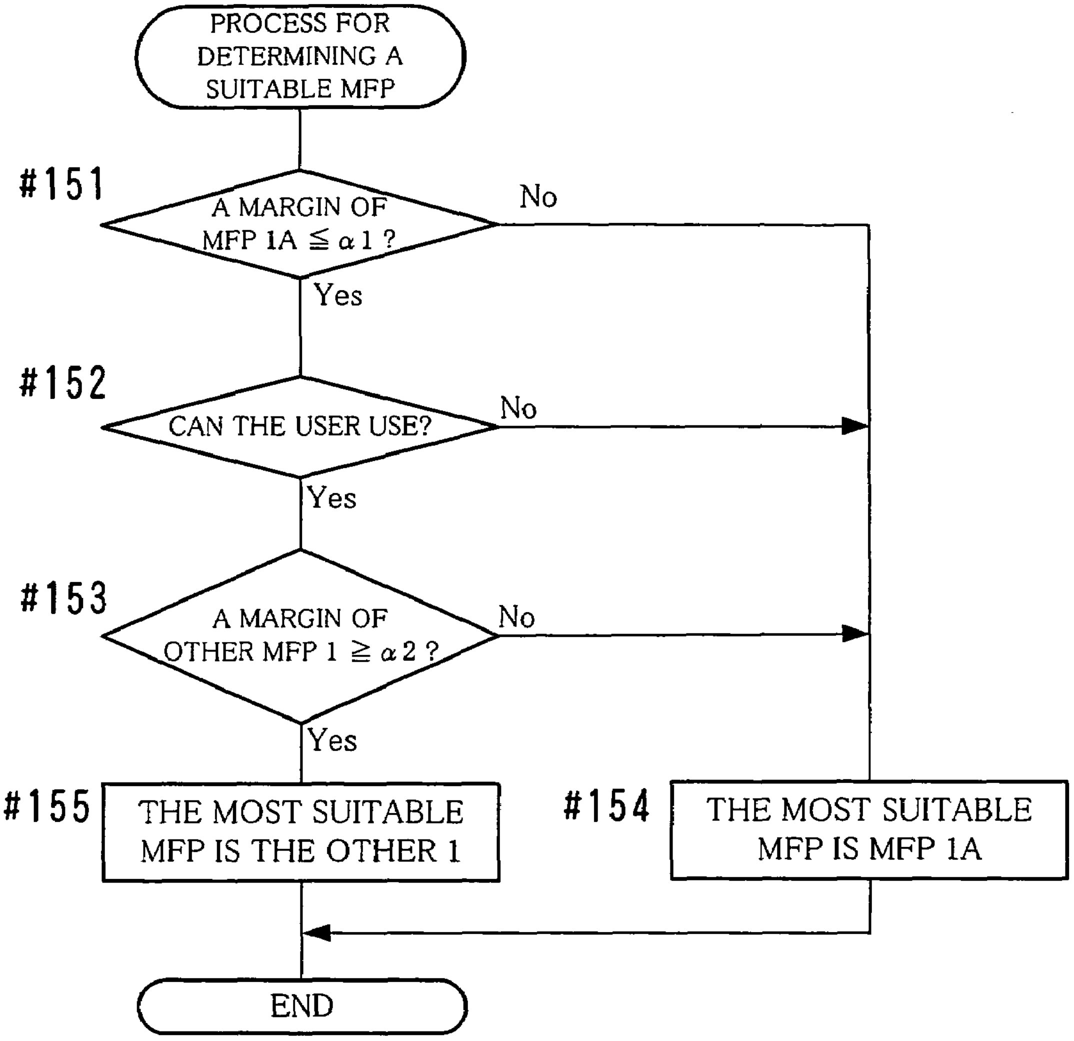
FIG. 15 is a flowchart showing an example of a flow of a process for determining a suitable MFP.
Figure 16:
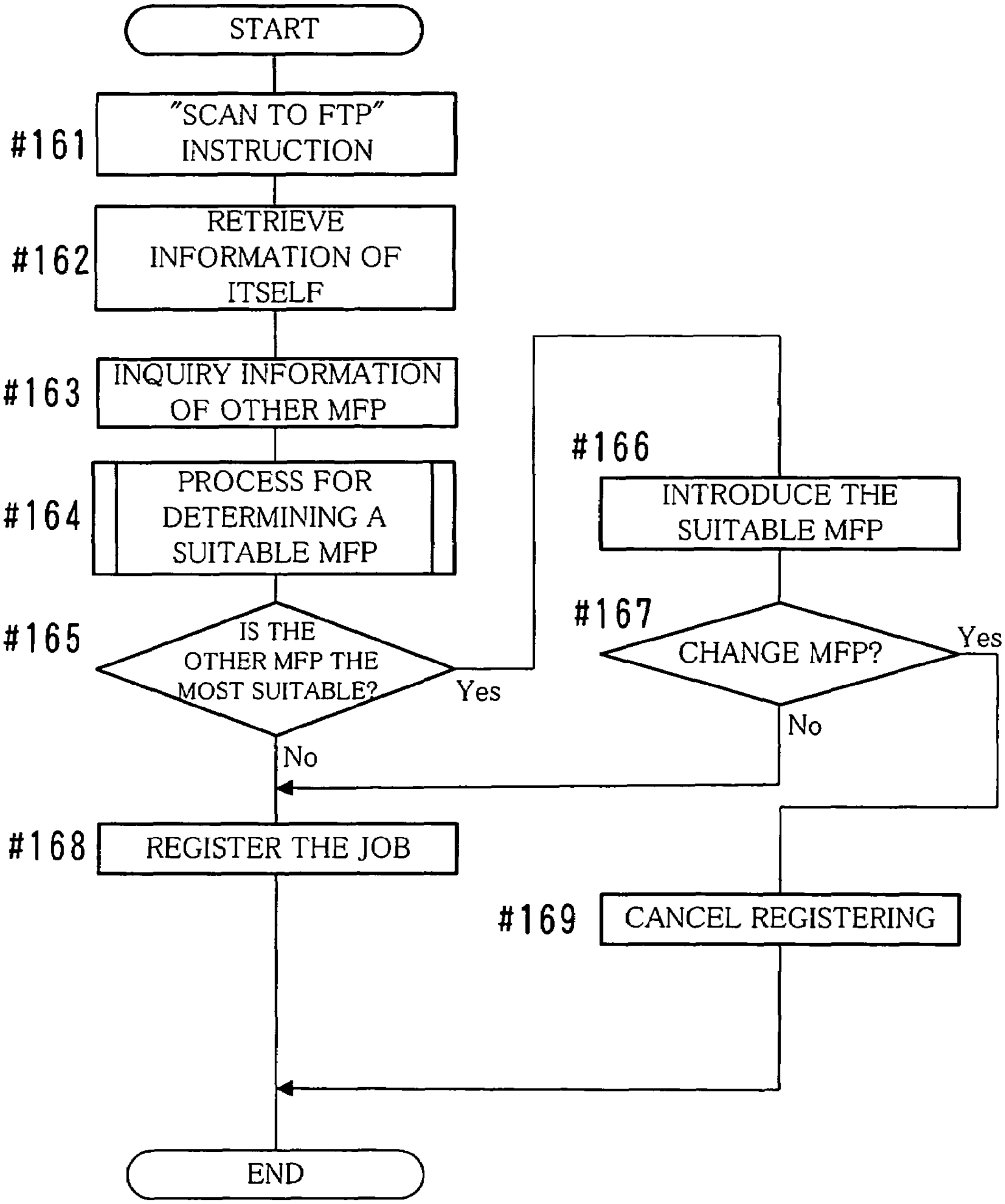
FIG. 16 is a flowchart showing an example of a flow of a process in the image forming device when it performs a "SCAN TO FTP" job.
Figure 17:
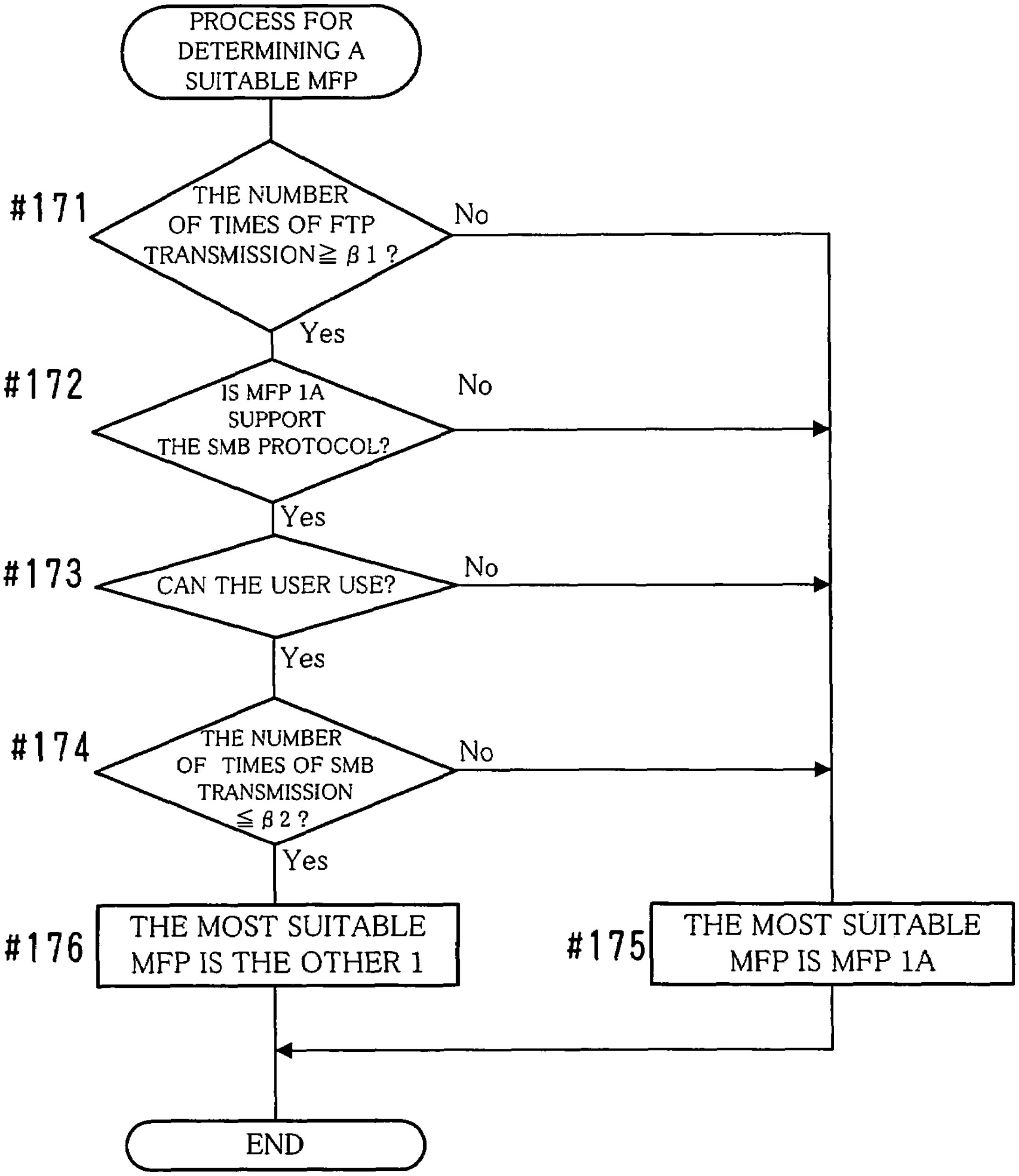
FIG. 17 is a flowchart showing an example of a flow of a process for determining a suitable MFP.

FIG. 14 is a flowchart showing an example of a flow of a process in the image forming device 1 when it performs a "SCAN TO BOX" job, FIG. 15 is a flowchart showing an example of a flow of a process for determining a suitable MFP, FIG. 16 is a flowchart showing an example of a flow of a process in the image forming device 1 when it performs a "SCAN TO FTP" job, and FIG. 17 is a flowchart showing an example of a flow of a process for determining a suitable MFP.

In the example described above, it is determined whether or not there is another image forming device 1 that is more suitable for performing a copy or a print job than the image forming device 1 that was designated by the user first. And if there is such another image forming device 1, it is introduced to the user. It is also possible to introduce another image forming device 1 that is suitable for other job.

When the user stores image data of an original image that was scanned by the canner 5*e* in the personal box of the user (when performing the "SCAN TO BOX"), it is possible to introduce another image forming device 1 that is more suitable than the image forming device 1 designated by the user first by the process as shown in FIG. 14.

For example, the user who logged in the image forming device 1A sets the original to be processed on the original glass plate of the scanner 5*e* of the image forming device 1A and operates the operation panel 5*h* for instructing the "SCAN TO BOX". When the image forming device 1A receives the instruction (#131 in FIG. 14), it retrieves the job type usage situation information 71*a* and the usage result information 72*a* of the image forming device 1A itself (see FIGS. 5 and 6) (#132) and accesses other image forming devices 1 so as to obtain the job type usage situation information 71 and the usage result information 72 of each of them as well as the user profile of the user (#133).

In accordance with the obtained job type usage situation information 71, usage result information 72 and user profile, the image forming device 1A determines which is more suitable to store the image data in a box that is provided to the image forming device 1A or to store them in a box that is provided to another image forming device 1 in a manner as shown in FIG. 15 (#134).

If the free space in the hard disk drive of the image forming device 1A is larger than a threshold level al, i.e., if there is still a margin in the free space (No in #151 shown in FIG. 15), it is decided that storing in a box of the image forming device 1A itself is suitable (#154).

If the free space in the hard disk drive of the image forming device 1A is less than or equal to the threshold level al, i.e., if there is no margin in the free space (Yes in #151), another image forming device 1 that includes the hard disk drive having a free space more than or equal to a threshold level a2 and that the user has right to use is searched (#152, #153). Namely, another image forming device 1 that the user can use and that includes the hard disk drive having a margin of a free space is searched. When such another image forming device 1 is found (Yes in #152 and Yes in #153), it is determined that storing in a box of the image forming device 1 would be suitable (#155). If such another image forming device 1 is not found (No in #152 or No in #153), it is determined that storing in a box of the image forming device 1A would be suitable (#154).

With reference to FIG. 14 again, if it is determined that storing in a box of the image forming device 1A is suitable (No in #135), a job for executing the process for scanning an original and storing image data of the original in a user's box in the image forming device 1A (namely, the "SCAN TO BOX" job) is generated, and the job is registered in the queue of the image forming device 1A (#138). Then, the job is executed when its turn comes.

If it is determined that storing in a box of another image forming device 1 is suitable (Yes in #135), the user is notified of it (#136). Then, the user instructs to change the storage destination to a box of the other image forming device 1 (Yes in #137), the process for storing the image data in the image forming device 1A is stopped (#139). In this case, it is possible to instruct to send the image data to the other image forming device 1 and to store them in the user's box (#140). If the user does not want to change the storage destination (No in #137), the "SCAN TO BOX" job is generated and is stored in the queue of the image forming device 1A (#138).

In this way, it is possible to provide a user with an environment where an efficient work can be realized using the plural image forming devices 1 in accordance with purpose, by introducing the image forming device 1 that is suitable from the viewpoint of a margin of free space in the hard disk drive. Namely, even if a size of image data to be saved becomes large due to an image size, the number of sheets or a compression mode for example, occurrence of a memory overflow error can be avoided when the user changes the storage destination in accordance with the introduction in advance. Thus, time and effort for executing the job again can be reduced.

Note that it is possible not only to determine the image forming device 1 that is suitable for the storage destination of the image data of the original but also to determine the image forming device 1 that is suitable for scanning the original. Namely, similarly to the copy job described above, it is possible to retrieve the usage result information 72 of each of the image forming device 1A and the other image forming device 1 and to determine the image forming device 1 that is suitable for scanning the original in accordance with the condition for reading the original (including a type of paper of the original to be scanned (plain paper or recycled paper, as well as A4 size or A3 size) and a single-sided original or a double-sided original). Then, the determination result is introduced to the user together with the determination result of the image forming device 1 that is suitable for storing the image data. Thus, the "SCAN TO BOX" job can be executed more suitably. There is a case where the former image forming device 1 is different from the latter image forming device 1. In this case, the image data may be transmitted from the former to the latter.

Furthermore, in the case of the job for transmitting the image data of the image of the original scanned by the scanner 5*e* to the terminal device 2 by FTP (when performing the "SCAN TO FTP" job), it is possible to perform the process in the procedure as shown in FIG. 16 so as to introduce another image forming device 1 that is more suitable than the image forming device 1 that the user designated first.

For example, the user who logged in the image forming device 1A sets an original to be processed on the original glass plate of the scanner 5*e* of the image forming device 1A and operates the operation panel 5*h* so as to give the instruction of the "SCAN TO FTP" job. When the image forming device 1A receives the instruction (#161 in FIG. 16), it retrieves the job type usage situation information 71*a* and the usage result information 72*a* of the image forming device 1A itself (see FIGS. 5 and 6) (#162) and accesses other image forming devices 1 so as to obtain the job type usage situation information 71 and the usage result information 72 of each of them as well as the user profile of the user (#163).

In accordance with the obtained job type usage situation information 71, usage result information 72 and user profile, it is determined which is more suitable that the image forming device 1A performs the process for transmitting the image data or that the other image forming device 1 perform the process as shown in FIG. 17 (#164).

The number of times that the user has ever used the "SCAN TO FTP" job is checked (#171). If the number of times is less than the threshold level β1 (No in #171), it is determined that the image forming device 1A is suitable (#175). If the number of times is more than or equal to the threshold level β1 (Yes in #171), another image forming device 1 that supports the SMB protocol is searched, and it is checked whether or not the usage right of the image forming device 1 is given to the user (#172 and #173).

If the image forming device 1 that supports the SMB protocol and its usage right is given to the user is found (Yes in #172 and Yes in #173), the number of times that the user has used the "SCAN TO SMB" job in the image forming device 1 is checked (#174). Then, if the number of times is less than or equal to the threshold level β2 (Yes in #174), it is determined that the image forming device 1 is suitable (#176). If there is no image forming device 1 that supports the SMB, or if the user does not have the right to use the image forming device 1, or if the number of times that the user has used the "SCAN TO SMB" job is more than the threshold level β2 (No in #172 or No in #173 or No in #174), it is determined that the image forming device 1A is suitable (#175).

Namely, the determination process shown in FIG. 17 is aimed at checking whether or not the user has rarely used the function for transmitting data by the SMB protocol even though the user can use the image forming device 1 that is equipped with the function.

With reference to FIG. 16 again, if it is determined that it is suitable to perform the process for transmitting the image data by the image forming device 1A (No in #165), the "SCAN TO FTP" job is generated and is registered in the queue in the image forming device 1A (#168). Then, the job is executed when its turn comes.

On the other hand, if it is determined that it is suitable to perform the process by another image forming device 1 (Yes in #165), a message that indicates that the user can use the "SCAN TO SMB" job in the other image forming device 1 is displayed for introduction (#166). Then, if the user changes the subject of the process for transmitting the image data of the original from the image forming device 1A to the introduced image forming device 1 (Yes in #167), the instruction to the image forming device 1A accepted in Step #161 is canceled, and the transmission process is stopped (#169). If the user does not want to change the subject of the process (No in #167), the "SCAN TO FTP" job is registered in the queue in the image forming device 1A as designated by the user first (#168).

As descried above, when the user often uses the function for transmitting image data obtained by scanning an original to a server or the like, the data transmission function according to the SMB protocol can be introduced to the user effectively in accordance with the method described above. Namely, if the user rarely uses or does not use completely the data transmission function by the SMB protocol, which has an advantage that a folder as a destination of transmission of the image data can be designated directly, even though the function is provided, this function is introduced to the user according to the method described above. It can be guessed that the user performs data transmission using another function without knowing the data transmission function by the SMB protocol. Therefore, it is very useful and effective to introduce the data transmission function by the SMB protocol to the user.

Figure 18:
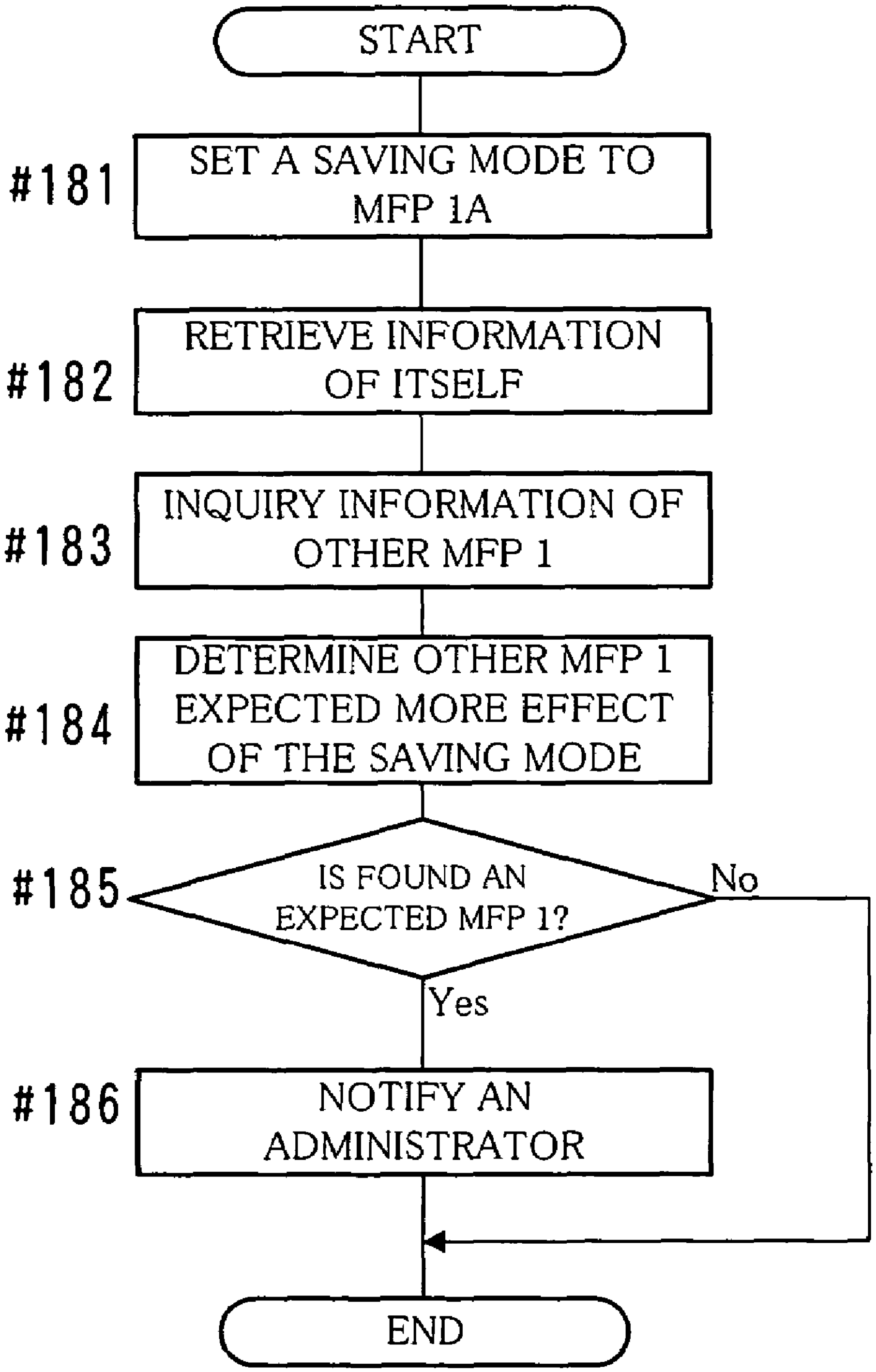
FIG. 18 is a flowchart showing an example of a flow of a process in the image forming device when it notifies information about a saving mode.
Figure 19:
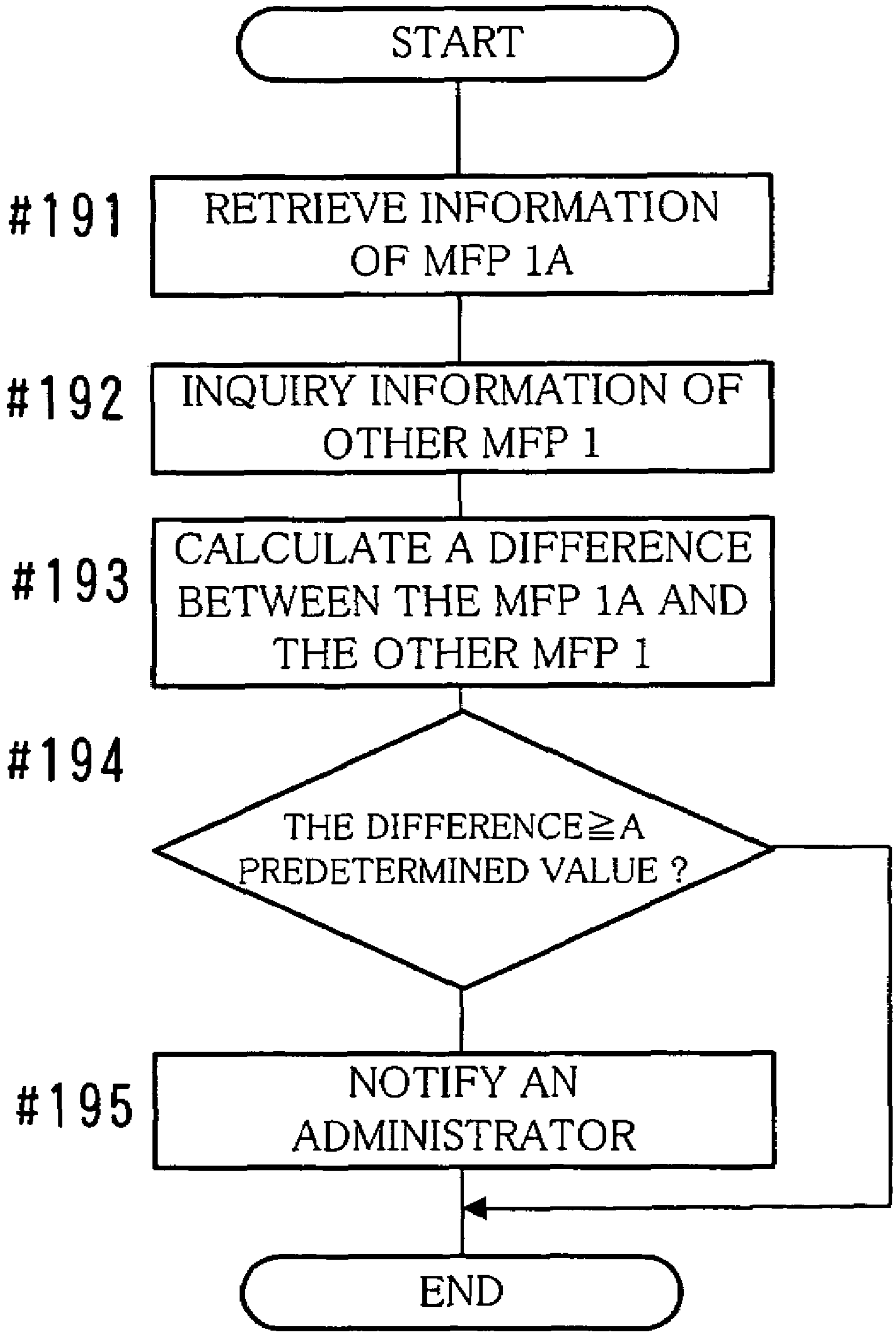
FIG. 19 is a flowchart showing an example of a flow of a process in the image forming device when it notifies a difference of the usage situation between image forming devices.

FIG. 18 is a flowchart showing an example of a flow of a process in the image forming device 1 when it notifies information about a saving mode, and FIG. 19 is a flowchart showing an example of a flow of a process in the image forming device 1 when it notifies a difference of the usage situation between image forming devices 1.

The MFP state notifying portion 128 shown in FIG. 2 performs the process for notifying an administrator or a person who is in charge of maintenance of information about a state of the image forming device 1 in the procedure as shown in FIG. 18 or 19.

For example, it is supposed that the administrator of the image-related process system SY issued an instruction for switching a mode so as to set a saving mode to the image forming device 1A (#181 in FIG. 18). Note that the "saving mode" is a mode for executing a process such as printing with saving a running cost by setting a use of recycled paper as paper for output in default or by setting the double-sided print mode.

When the saving mode is set, the image forming device 1A retrieves the MFP specification information 70 of the image forming device 1A itself (#182) and accesses other image forming devices 1 that are provided to the image-related process system SY so as to obtain the MFP specification information 70 of each of them as well as information that indicates a current default process condition (hereinafter, referred to as "default process condition information") (#183).

It is determined whether or not the image forming devices 1 satisfy the following condition (#184). (a) It is possible to set the saving mode. (b) The saving mode is not set at present. (c) A running cost for performing a process in the saving mode is less than or equal to that of the image forming device 1A.

Whether or not the condition (a) is satisfied can be determined by checking whether or not the MFP specification information 70 of the image forming device 1 indicates that the image forming device 1 is equipped with the function of using recycled paper or the function of the double-sided print. Whether or not the condition (b) is satisfied can be determined by checking whether or not the current default paper for output is set to use paper except recycled paper or whether or not the default process condition information of the image forming device 1 indicates that the single-sided printing mode is set (namely, that a process condition except the saving mode is set). Whether or not the condition (c) is satisfied can be determined by comparing the running cost indicated in the MFP specification information 70 of the image forming device 1 with that indicated in the MFP specification information 70 of the image forming device 1A.

Then, if the image forming device 1 that satisfies all the conditions of (a)-(c) is found (Yes in #185), a message for notifying of it is sent to the administrator by electronic mail or the like (#186). Thus, it is possible to appeal the administrator about the other image forming device 1 that can be expected more effect of the saving mode than the image forming device 1A.

Alternatively, information about difference of usage situation between image forming devices 1 is transmitted to an administrator or a person who is in charge of maintenance regularly (for example, every month). For example, as shown in FIG. 19, the image forming device 1A retrieves the job type usage situation information 71 and the usage result information 72 of the image forming device 1A itself (#191) and accesses other image forming devices 1 that are provided to the image-related process system SY so as to obtain the job type usage situation information 71 and the usage result information 72 of each of them (#192).

In accordance with the obtained job type usage situation information 71*a*, 71*b*, . . . , the number of usage times of each job type in the image forming device 1A and the other image forming devices 1 during a predetermined period (for example, during the past one month) are summarized so as to calculate a difference between the summed value of the image forming device 1A and the summed value of each of the other image forming devices 1 for each job type (#193).

Then, if there is a job type of which the difference between the summed value of the image forming device 1A and the summed value of the other image forming device 1 is more than or equal to a predetermined value (Yes in #194), information that indicates the job type and how large the difference is, the usage result information 72 of the image forming device 1A and the usage result information 72 of the other image forming device 1 are sent to the administrator so as to notify that the state of the image forming device 1A is checked (#195). Thus, it is possible to advise the administrator to check a cause of difference of the usage situations. The administrator may study about a bad point or a poor point in the hardware or the software structure and remove the cause of the difference of the usage situation by updating, by adding a function or by repairing so that each of the image forming devices 1 can be used efficiently by the maintenance.

According to this embodiment, in the image-related process system SY that includes a plurality of image forming devices 1, the image forming device 1 that is suitable for the user can be determined and introduced more effectively than before.

In addition, if there is a large difference of usage situation among the plural image forming devices 1, an administrator is notified of the fact as well as the MFP specification information 70 of each of the image forming devices 1. Thus, the administrator can know quickly that there is a malfunction in the image forming device 1, so that processes can be performed effectively as a whole of the image-related process system SY by maintenance. In addition, the if a saving mode is set to any one of image forming devices 1, the administrator can be notified of the other image forming device 1 that can perform the process at lower cost than the image forming device 1. Thus, a running cost can be reduced effectively.

Although it is determined whether or not a job such as copying, network printing or scanning is performed suitably, and a suitable image forming device 1 is introduced to a user in this embodiment, the present invention can be applied to other types of jobs. For example, it is possible to determine and introduce the image forming device 1 that is most suitable for the fax transmission job. Alternatively, it is possible to determine and introduce the image forming device 1 that is most suitable for a special print job such as 2 in 1 printing or booklet printing.

Furthermore, the structure of the entire or each part of the image-related process system SY, the image forming device 1 or the terminal device 2, the contents of the processes, the order of the processed, the structure of the profile and the job types can be modified if necessary in accordance with the spirit of the present invention.

The present invention can be used eligibly particularly in an environment such as a middle or larger scale of office where a plurality of image forming devices 1 are installed.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. An image processor for executing an image-related process that is a process related to an image, the image processor comprising:

a usage situation storing portion for storing first usage situation information that indicates a usage situation of the image processor;

a usage situation information obtaining portion for obtaining second usage situation information that indicates a usage situation of a second image processor for executing the image-related process;

a suitable image processor determining portion for determining a second image processor that can execute the image-related process more suitably than the image processor in accordance with the first usage situation information and the second usage situation information when an execution instruction of the image-related process is given by a user;

a process execution control portion for controlling so that the execution of the image-related process is suspended in the image processor if it is determined that there is a second image processor that can execute the image-related process of the execution instruction more suitably than the image processor and so that the image-related process is executed in the image processor if it is not determined that there is a second image processor that can execute the image-related process of the execution instruction more suitably than the image processor; and a message output portion for delivering a message to the user who issued the execution instruction if it is determined that there is a second image processor that can execute the image-related process of the execution instruction more suitably than the image processor, the message indicating that it is better to execute the image-related process by the second image processor.

2. The image processor according to claim 1, further comprising a storage portion for storing image data, wherein the suitable image processor determining portion determines that the second image processor is suitable when a free space of the storage portion of the image processor that is indicated in the first usage situation information of the image processor is less than a predetermined value and a free space of a storage portion of the second image processor that is indicated in the second usage situation information of the second image processor is more than a predetermined value if the image-related process of the execution instruction is a storing process for storing image data.

3. The image processor according to claim 1, wherein the image-related process includes at least one of a copier function, a network printer function, a fax function, a scanner function and a document server function.

4. The image processor according to claim 1, wherein the first usage situation information of the image processor indicates a rate of occurrence of a malfunction in the image processor for each type of the image-related process, the second usage situation information of the second image processor indicates a rate of occurrence of a malfunction in the second image processor for each type of the image-related process, and the suitable image processor determining portion determines that the second image processor is suitable when the rate of occurrence of a type of the image-related process of the execution instruction that is indicated in the second usage situation information of the second image processor is lower than the rate of occurrence of the type that is indicated in the first usage situation information of the image processor.

5. The image processor according to claim 1, wherein the process execution control portion controls so that the execution of the image-related process is stopped in the image processor and is instead executed by the second image processor that was determined to be able to execute the image-related process more suitably than the image processor if the user issued a change instruction for changing a subject of the image-related process of the execution instruction.

6. An image processor for executing an image-related process that is a process related to an image, the image processor comprising:

a usage situation storing portion for storing first usage situation information that indicates usage situation of the image processor;

a usage situation information obtaining portion for obtaining second usage situation information that indicates usage situations of a second image processor for executing the image-related process; and a notifying portion for notifying an administrator if a difference between a usage situation indicated in the first usage situation information and a usage situation indicated in the second usage situation information is more than a predetermined value.

7. The image processor according to claim 6, wherein the image-related process includes at least one of a copier function, a network printer function, a fax function, a scanner function and a document server function.

8. The image processor according to claim 6, wherein the first usage situation information indicates the number of executing times in the past of the image-related process for each type of image-related process in the image processor, the second usage situation information of the second image processor indicates the number of executing times in the past for each type of image-related process in the second image processor, and the notifying portion notifies the administrator if a difference between the number of executing times indicated in the first usage situation information and the number of executing times indicated in the second usage situation information for at least one of the types is more than a predetermined value.

9. An image processor for executing an image-related process that is a process related to an image, the image processor comprising:

a usage situation information obtaining portion for obtaining first usage situation information that indicates a usage situation of the image processor and second usage situation information that indicates usage situations of a second image processor in accordance with a process condition of the image-related process that is entered;

a suitable image processor determining portion for determining a second image processor that can execute the image-related process more suitably than the image processor in accordance with the obtained first usage situation information and second usage situation information; and a message output portion for delivering a message to the user who issued an instruction of the image-related process if it is determined that there is a second image processor that can execute the image-related process of the process condition more suitably than the image processor, the message indicating that it is better to execute the image-related process by the second image processor.

10. The image processor according to claim 9, further comprising a storage portion for storing image data, wherein the suitable image processor determining portion determines that the second image processor is suitable when a free space of the storage portion of the image processor that is indicated in the first usage situation information of the image processor is less than a predetermined value and a free space of a storage portion of the second image processor that is indicated in the second usage situation information of the second image processor is more than a predetermined value if the image-related process is a storing process for storing image data.

11. The image processor according to claim 9, wherein the image-related process includes at least one of a copier function, a network printer function, a fax function, a scanner function and a document server function.

12. The image processor according to claim 9, wherein the usage situation information obtaining portion obtains information that indicates a usage situation of a first function of the image processor as the first usage situation information and obtains information that indicates a usage situation of a second function of the second image processor as the second usage situation information.

13. The image processor according to claim 12, wherein the image-related process is a process for scanning an original to produce image data and sending the image data to another device, the first function is a function for sending data by FTP, and the second function is a function for sending data by SMB.

* * * * *